United States Patent
Yang et al.

(10) Patent No.: US 8,811,326 B2
(45) Date of Patent: Aug. 19, 2014

(54) METHOD AND DEVICE FOR ALLOCATING CONTROL CHANNEL

(75) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 13/583,837

(22) PCT Filed: Mar. 11, 2011

(86) PCT No.: PCT/KR2011/001719
§ 371 (c)(1),
(2), (4) Date: Sep. 10, 2012

(87) PCT Pub. No.: WO2011/112037
PCT Pub. Date: Sep. 15, 2011

(65) Prior Publication Data
US 2012/0327917 A1    Dec. 27, 2012

Related U.S. Application Data

(60) Provisional application No. 61/313,083, filed on Mar. 11, 2010, provisional application No. 61/317,235, filed on Mar. 24, 2010, provisional application No. 61/320,293, filed on Apr. 1, 2010, provisional application No. 61/324,301, filed on Apr. 15, 2010, provisional application No. 61/326,205, filed on Apr. 20, 2010, provisional application No. 61/328,676, filed on Apr. 28, 2010.

(51) Int. Cl.
*H04W 4/00* (2009.01)
*H04B 7/208* (2006.01)
*H04J 3/16* (2006.01)

(52) U.S. Cl.
USPC .......................................... 370/329; 370/330

(58) Field of Classification Search
USPC ................................................... 370/329, 330
See application file for complete search history.

(56) References Cited

U.S. PATENT DOCUMENTS

| | | | |
|---|---|---|---|
| 8,385,268 B2 * | 2/2013 | Chen et al. | 370/328 |
| 8,494,454 B2 * | 7/2013 | McBeath et al. | 455/68 |
| 2008/0205349 A1 | 8/2008 | Kim et al. | |
| 2008/0225786 A1 * | 9/2008 | Han et al. | 370/329 |
| 2009/0209247 A1 * | 8/2009 | Lee et al. | 455/422.1 |

(Continued)

FOREIGN PATENT DOCUMENTS

| WO | WO 2008/082280 A1 | 7/2008 |
|---|---|---|
| WO | WO 2008/153329 A1 | 12/2008 |

*Primary Examiner* — Jay P Patel
(74) *Attorney, Agent, or Firm* — Birch, Stewart, Kolasch & Birch, LLP

(57) ABSTRACT

The present invention relates to a wireless communication system. More particularly, the present invention relates to a method and a device which enable a terminal to receive a control channel in a wireless communication system that uses multi-carriers, the method comprising the following steps: receiving a plurality of search space through a sub-frame, wherein each of the search spaces includes a plurality of control channel candidate sets and each of the search spaces corresponds to each of the carriers; and monitoring the control channel candidates for control channels, wherein the plurality of search spaces are connected in the resource region for the control channels according to an allocation pattern and with the starting point as the basis, and the allocation pattern changes according to time.

12 Claims, 28 Drawing Sheets

(56) References Cited

U.S. PATENT DOCUMENTS

| | | | |
|---|---|---|---|
| 2010/0246721 A1* | 9/2010 | Chen et al. | 375/316 |
| 2010/0260124 A1* | 10/2010 | Noshio et al. | 370/329 |
| 2010/0304689 A1* | 12/2010 | McBeath et al. | 455/68 |
| 2011/0103321 A1* | 5/2011 | Nishio et al. | 370/329 |
| 2011/0110315 A1* | 5/2011 | Chen et al. | 370/329 |
| 2011/0274005 A1* | 11/2011 | Lee et al. | 370/252 |
| 2012/0113932 A1* | 5/2012 | Nishio et al. | 370/329 |
| 2012/0163437 A1* | 6/2012 | Frederiksen et al. | 375/224 |
| 2013/0021989 A1* | 1/2013 | Tiirola et al. | 370/329 |
| 2013/0176972 A1* | 7/2013 | Nishio et al. | 370/329 |

* cited by examiner

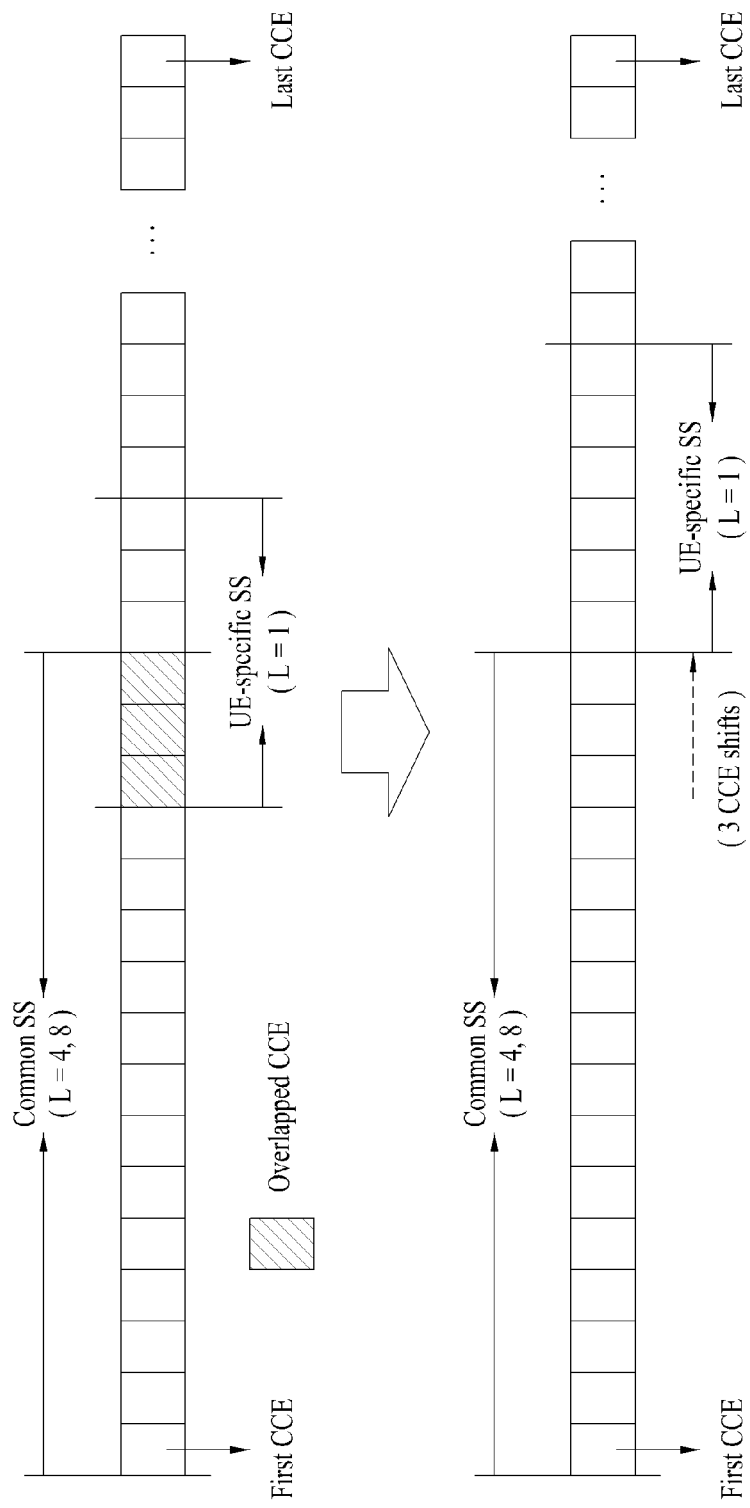

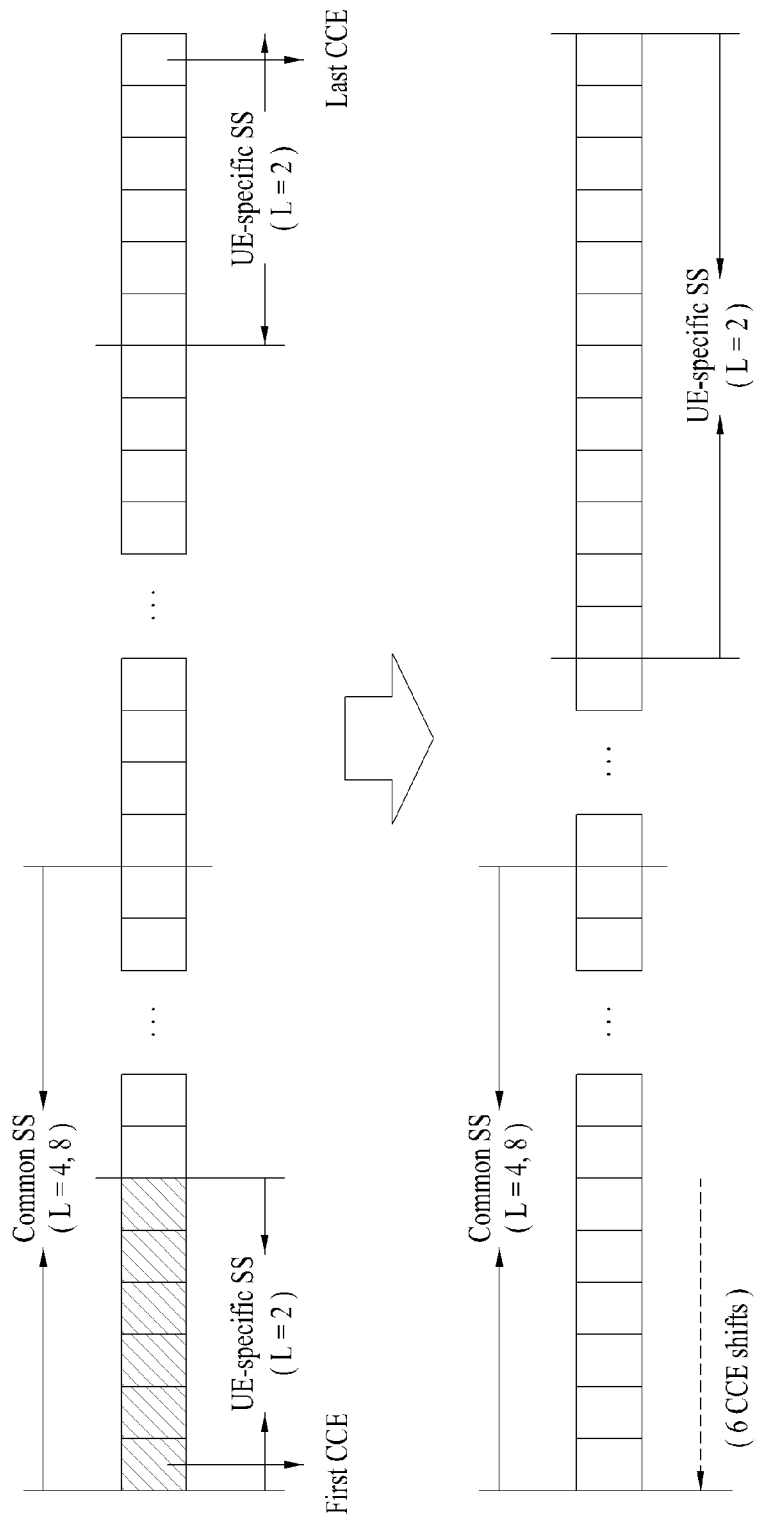

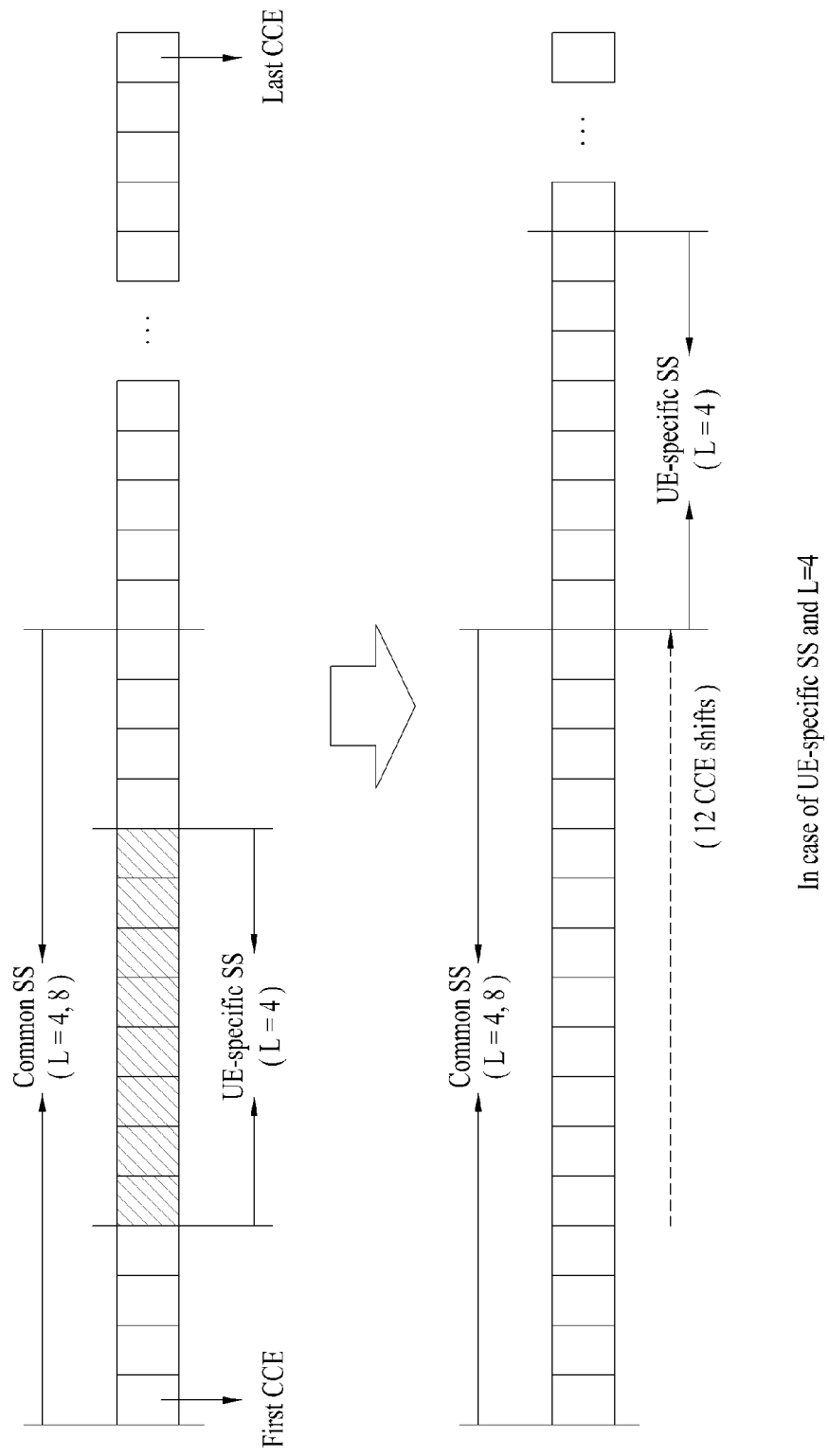

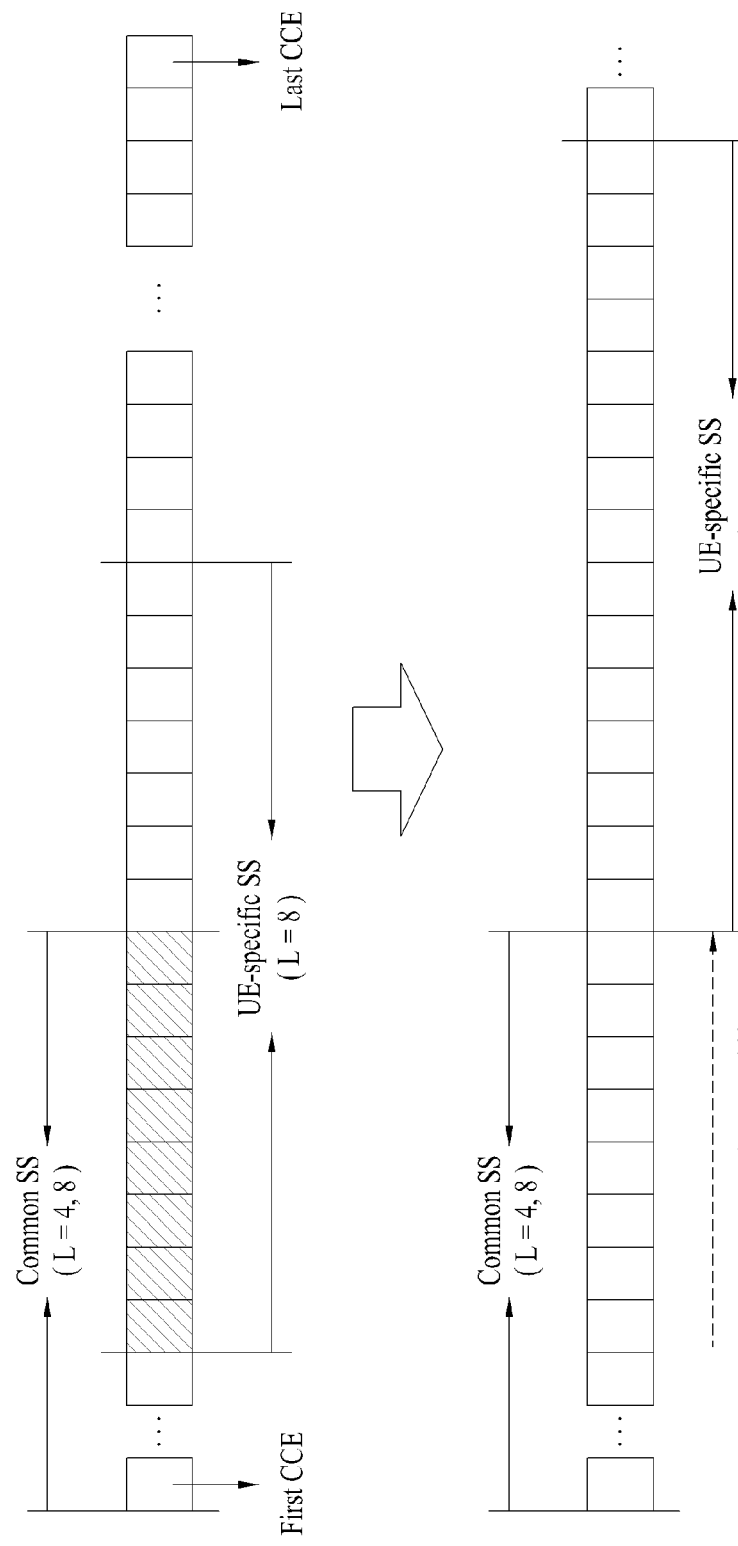

\* If there is a possibility of causing ambiguity in control channel
(or control information) between the common search space and
the UE-specific search space, it is assumed that transmission of
at least some of control channel candidates is limited in the common search space.

\* If there is a possibility of causing ambiguity in control channel
(or control information) between the common search space and
the UE-specific search space, it is assumed that transmission of
at least some of control channel candidates is limited in the common search space.

\* If there is a possibility of causing ambiguity in control channel
(or control information) between the common search space and
the UE-specific search space, it is assumed that transmission of
at least some of control channel candidates is limited in the UE-specific search space.

* If there is a possibility of causing ambiguity in control channel
(or control information) between the common search space
and the UE-specific search space, it is assumed that transmission of
at least some of control channel candidates is limited in the UE-specific search space.

METHOD AND DEVICE FOR ALLOCATING CONTROL CHANNEL

CROSS REFERENCE TO RELATED APPLICATIONS

This application is the National Phase of PCT/KR2011/001719 filed on Mar. 11, 2011, which claims priority under 35 U.S.C. §119(e) to U.S. Provisional Application Nos. 61/313,083 filed on Mar. 11, 2010, 61/317,235 filed on Mar. 24, 2010, 61/320,293 filed on Apr. 1, 2010, 61/324,301 filed on Apr. 15, 2010, 61/326,205 filed on Apr. 20, 2010, and 61/328,676 filed on Apr. 28, 2010, all of which are hereby expressly incorporated by reference into the present application.

TECHNICAL FIELD

The present invention relates to a wireless communication system, and more particularly to a method and apparatus for allocating a control channel.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

Accordingly, the present invention is directed to a method and apparatus for allocating a control channel. An object of the present invention is to provide a method and apparatus for efficiently allocating a control channel in a wireless communication system supporting carrier aggregation (CA). Another object of the present invention is to provide a method and apparatus for overcoming ambiguity/blocking capable of being generated in control channel allocation. Another object of the present invention is to provide a method and apparatus for efficiently performing blind decoding of a control channel. Another object of the present invention is to provide a method and apparatus for constructing a search space to efficiently transmit a control channel.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for receiving a control channel by a user equipment (UE) in a wireless communication system supporting multiple carriers, the method including: receiving a plurality of search spaces through a subframe, wherein each search space includes a plurality of control channel candidate sets and each search space corresponds to each carrier; and monitoring control channel candidates for the control channel, wherein the plurality of search spaces is concatenated according to an allocation pattern on the basis of a start point in a resource region for the control channel, and the allocation pattern is changed with time.

In another aspect of the present invention, a user equipment (UE) configured to receive a control channel in a wireless communication system supporting multiple carriers includes a radio frequency (RF) unit; and a processor. The processor receives a plurality of search spaces through a subframe, and monitors control channel candidates for the control channel. Each search space includes a plurality of control channel candidate sets and each search space corresponds to each carrier. The plurality of search spaces is concatenated according to an allocation pattern on the basis of a start point in a resource region for the control channel, and the allocation pattern is changed with time.

The start point may include a start resource of a firstly allocated search space from among the plurality of search spaces, and the start point may be hopped in units of a subframe in the resource region for the control channel.

The order for allocating individual search spaces within the plurality of search spaces may be cyclically shifted according to time.

The direction for allocating the plurality of search spaces may be changed with time in the resource region for the control channel.

If a start resource of a search space for a primary component carrier (CC) is not identical to the start point by the allocation pattern, the plurality of search spaces may be shifted in a manner that a start resource of the search space for the primary CC is identical to the start point.

The plurality of search spaces may include a UE-specific search space, and control channel candidates belonging to different UE-specific search spaces may be distinguished from each other using a carrier indicator field (CIF) value.

The control channel may include a physical downlink control channel (PDCCH) including a carrier indicator field (CIF), and a resource for the control channel may include a control channel element (CCE).

Advantageous Effects

As is apparent from the above description, exemplary embodiments of the present invention have the following effects. A control channel can be efficiently allocated in a wireless communication system supporting carrier aggregation. The embodiments of the present invention can overcome ambiguity/blocking capable of being generated when a control channel is allocated. The embodiments of the present invention can efficiently perform blind decoding of a control channel. The embodiments of the present invention can efficiently construct a search space.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 10A to 10D exemplarily show one method for overcoming ambiguity encountered in control channel reception according to one embodiment of the present invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
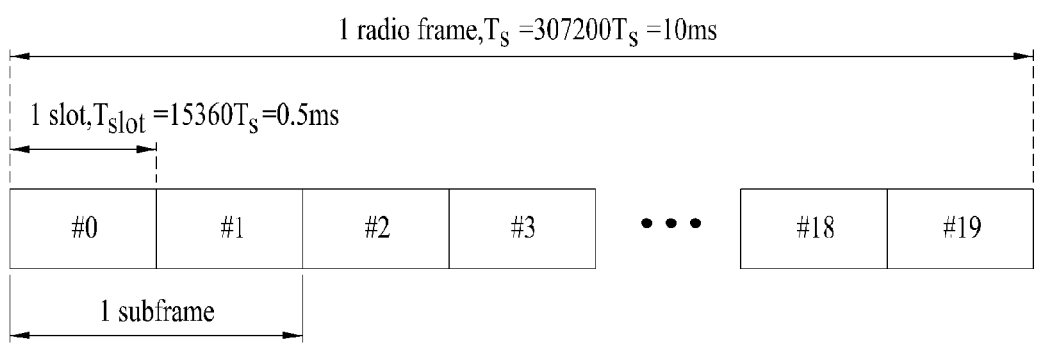
FIG. 1 exemplarily shows a radio frame structure for use in a 3rd Generation Partnership Project (3GPP) system.

FIG. 1 exemplarily shows a radio frame structure for use in a 3rd Generation Partnership Project (3GPP) system.

Referring to FIG. 1, a radio frame includes 10 subframes, and one subframe includes two slots in a time domain. A time required for transmitting one subframe is defined as a Transmission Time Interval (TTI). For example, one subframe may have a length of 1 ms and one slot may have a length of 0.5 ms. One slot may include a plurality of Orthogonal Frequency Division Multiplexing (OFDM) symbols or a Single Carrier Frequency Division Multiple Access (SC-FDMA) symbol in a time domain. Since the LTE system uses OFDMA in downlink and uses SC-FDMA in uplink, the OFDM or SC-FDMA symbol indicates one symbol duration. A resource block (RB) is a resource allocation unit and includes a plurality of contiguous carriers in one slot. The structure of the radio frame is only exemplary. Accordingly, the number of subframes included in the radio frame, the number of slots included in the subframe or the number of symbols included in the slot may be changed in various manners.

Figure 2:
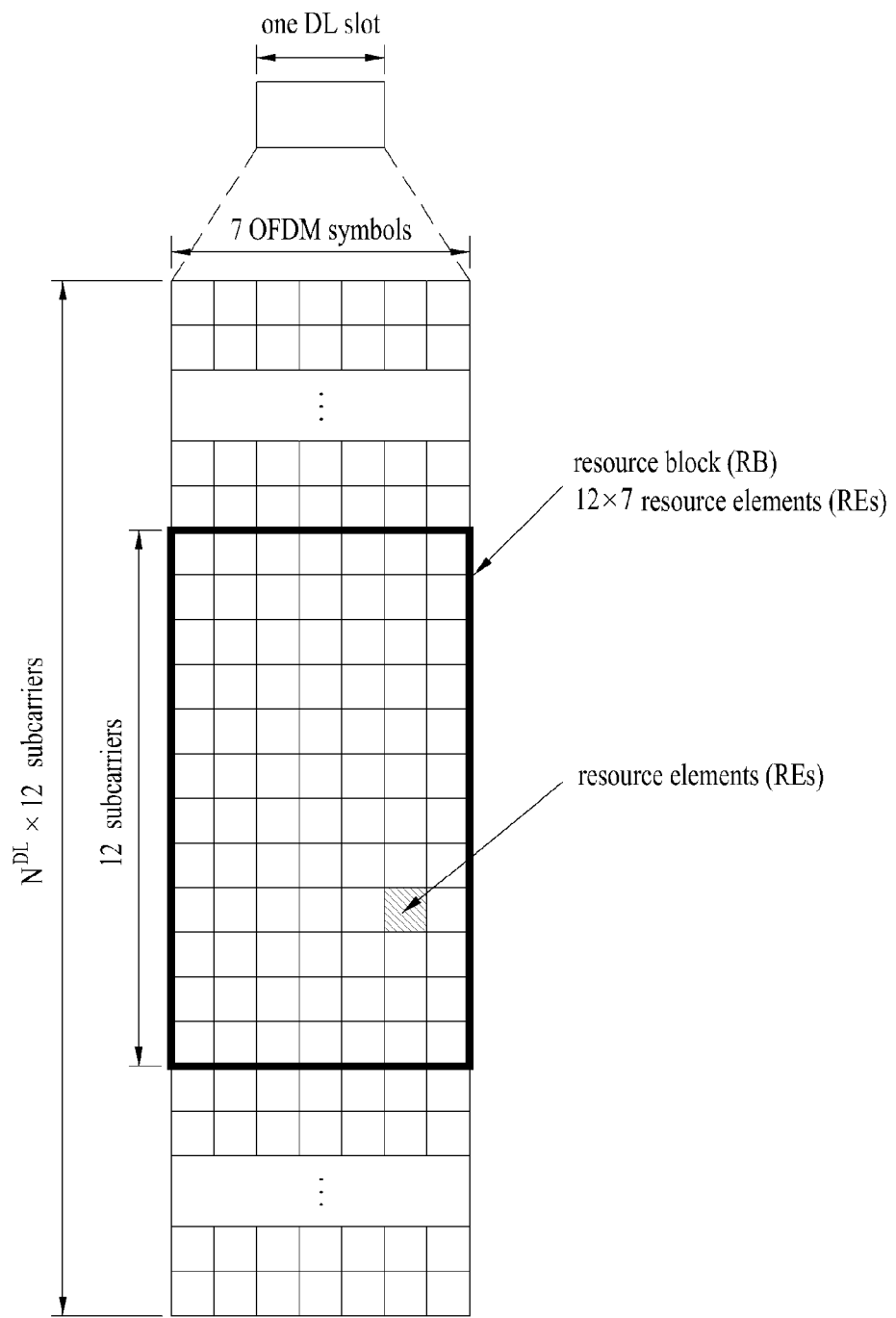
FIG. 2 exemplarily shows a resource grid of a downlink (DL) slot.

FIG. 2 exemplarily shows a resource grid of a downlink slot.

Referring to FIG. 2, a downlink slot includes a plurality of OFDM symbols in a time domain. One downlink slot includes 7 (or 6) OFDM symbols and a resource block (RB) includes 12 subcarriers in a frequency domain. Each element on a resource grid may be defined as a resource element (RE). One RB includes 12×7 (or 12×6) REs. The number ($N^{DL}$) of RBs contained in a downlink slot is dependent upon a downlink transmission bandwidth. An uplink slot structure is identical to the downlink slot structure, but OFDM symbols are replaced with SC-FDMA symbols in the uplink slot structure differently from the downlink slot structure.

Figure 3:
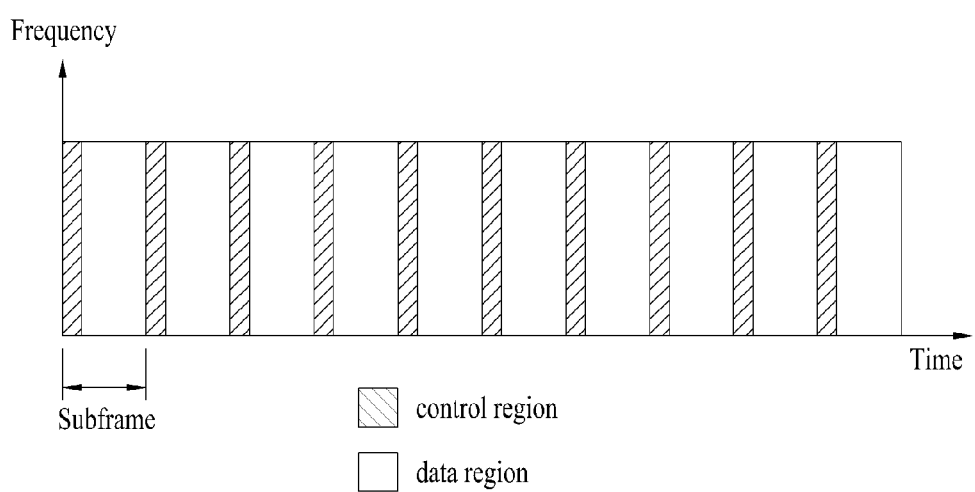
FIG. 3 exemplarily shows a downlink (DL) frame structure.

FIG. 3 is a downlink subframe structure.

Referring to FIG. 3, a maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE, for example, a Physical Control Format Indicator Channel (PCFICH), a Physical Downlink Control Channel (PDCCH), a Physical hybrid ARQ indicator Channel (PHICH), etc. PCFICH is transmitted from a first OFDM symbol of the subframe, and carries information about the number of OFDM symbols used for transmitting a control channel within the subframe. PHICH carries a Hybrid Automatic Repeat request acknowledgment/negative-acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes uplink/downlink (UL/DL) scheduling information, an uplink transmission (UL Tx) power control command, etc.

PDCCH carries a variety of information, for example, transmission format and resource allocation information of a downlink shared channel (DL-SCH), transmission format and resource allocation information of an uplink shared channel (UL-SCH), paging information transmitted over a paging channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A user equipment (UE) can monitor a plurality of PDCCHs. PDCCH is transmitted as an aggregate of one or more contiguous control channel elements (CCEs). CCE is a logical allocation unit that is used to provide a coding rate based on a radio channel state to a PDCCH. CCE may correspond to a plurality of resource element groups (REGs). The format of PDCCH and the number of PDCCH bits may be determined according to the number of CCEs. A base station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, an identifier of the corresponding UE (e.g., cell-RNTI (C-RNTI)) may be masked with the CRC. If PDCCH is provided for a paging message, a paging identifier (e.g., paging-RNTI (P-RNTI)) may be masked with a CRC. If PDCCH is provided for system information (e.g., system information block (SIC)), system information RNTI (SI-RNTI) may be masked with CRC. If PDCCH is provided for a random access response, random access-RNTI (RA-RNTI) may be masked with CRC. For example, CRC masking (or scrambling) may perform an XOR operation between CRC and RNTI at a bit level.

PDCCH may carry a message known as a DCI. Generally, several PDCCHs may be transmitted in a subframe. Each PDCCH is transmitted using one or more CCEs. One CCE may be mapped to 9 REGs, and one REG may be mapped to four REs. Four QPSK symbols may be mapped to individual REGs. Resource elements occupied by a reference signal (RS) are not contained in an REG. Therefore, the number of REGs for use in a given OFDM symbol is changed according to the presence or absence of a cell-specific reference signal (RS). REG concept may also be applied to other downlink control channels (that is, PDFICH and PHICH). As can be seen from Table 1, four PDCCH formats are supported.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered so that the CCEs can be contiguously used. In order to simplify the decoding process, a PDCCH having a format comprised of n CCEs may start from only a CCE having a specific number corresponding to a multiple of n. The number of CCEs used for transmission of a specific PDCCH may be determined by the base station (BS) according to a channel status. For example, in case of a PDCCH for a UE (for example, the UE may neighbor the BS) having a good DL channel, only one CCE can sufficiently satisfy the PDCCH. However, in case of a PDCCH for a UE having a poor channel (for example, the UE may exist in the vicinity of a cell edge), 8 CCEs may be requested to obtain sufficient robustness. In addition, a PDCCH power level may be adjusted in response to a channel status.

In the case of the LTE system, a CCE set in which a PDCCH may be located for each UE may be defined. CCE set in which the UE can discover its own PDCCH will hereinafter be referred to as a PDCCH search space or simply a search space (SS). Each resource through which a PDCCH can be transmitted within a search space (SS) is referred to as a PDCCH candidate. One PDCCH candidate may correspond to 1, 2, 4 or 8 CCEs according to a CCE aggregation level. The base station (BS) transmits an actual PDCCH (DCI) to an arbitrary PDCCH candidate contained in the search space (SS), and the UE monitors the search space to search for a PDCCH (DCI). In more detail, the UE attempts to perform blind decoding (BD) of PDCCH candidates contained in the search space (SS).

In the LTE system, the search spaces (SSs) for respective PDCCH formats may have different sizes. A dedicated (or UE-specific) search space (SS) and a common SS may be defined. The dedicated search space (SS) may be configured for each UE, and all UEs receive information regarding the common SS range. The dedicated or common SS may overlap with a given UE.

The search spaces (SSs) may be configured in small size and may overlap each other, such that it may be impossible for the base station (BS) to search for CCE resources that transmit a PDCCH to all desired UEs within a given subframe. That is, CCE resources have already been allocated to other UEs, because CCE resources for the corresponding UE may no longer be present in a search space of the specific UE (i.e., blocking of CCE resources). In order to minimize the possibility of blocking to be sustained in the next subframe, a UE-specific hopping sequence is applied to the start position of the dedicated search space. Table 2 shows the sizes of common and dedicated search spaces.

TABLE 2

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to control calculation load (or operation load) caused by the blind decoding attempt, the UE does not simultaneously search for all the defined DCI formats. Generally, the UE always searches for format 0 and format 1A in the dedicated search space. Format 0 and format 1A have the same size, and are distinguished from each other by a flag contained in a message. In addition, the UE may further request other formats (i.e., format 1, 1B or 2 according to PDSCH transmission mode established by the base station). The UE searches format 1A and format 1C in the common search space. In addition, the UE may be configured to search for format 3 or 3A. Formats 3/3A have the same size in the same manner as in formats 0/1A, and are distinguished from each other according to whether a scrambled CRC is used as another (common) identifier. Transmission modes and DCI format contents to construct the multi-antenna technology are as follows.

Transmission Mode

Transmission Mode 1: Transmission from a single base station antenna port

Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Transmission using UE-specific reference signals
DCI Format
Format 0: Resource grants for PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 4 is a flowchart illustrating a method for constructing a PDCCH by a base station (BS).

Figure 4:
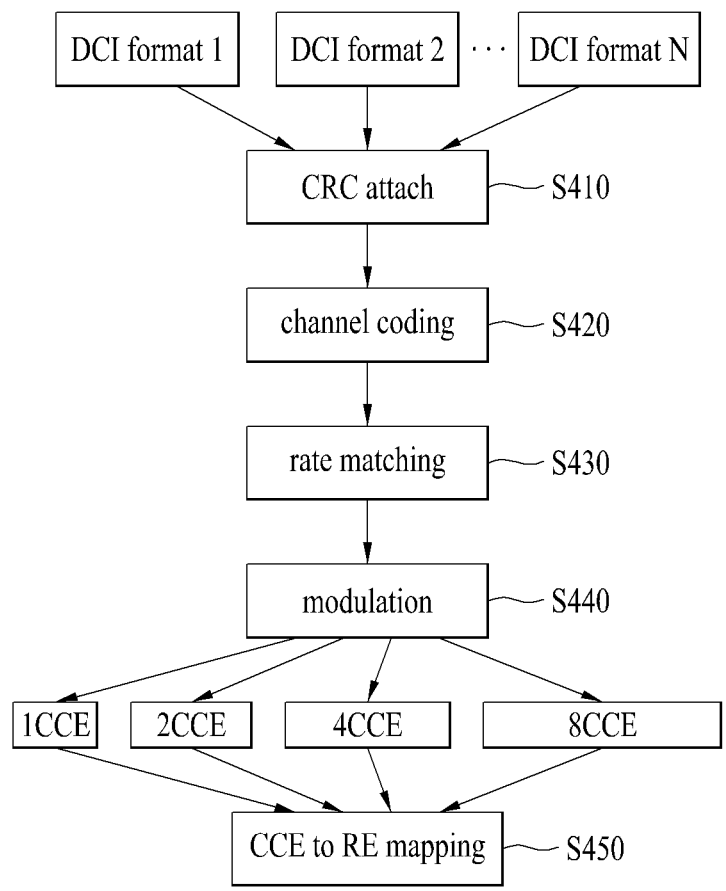
FIG. 4 is a flowchart illustrating a method for constructing a PDCCH by a base station (BS).

Referring to FIG. 4, the base station (BS) generates control information according to a DCI format. The base station (BS) may select one of a plurality of DCI formats (i.e., DCI formats 1, 2, ..., N) according to types of control information to be transmitted to the UE. In step S410, the base station (BS) attaches a cyclic redundancy check (CRC) for error detection to control information that is generated according to each DCI format. The CRC is masked with a Radio Network Temporary Identifier (RNTI) according to an owner or usage of the PDCCH. In other words, the PDCCH is CRC-scrambled with an identifier (e.g., RNTI).

Table 3 shows examples of identifiers masked to the PDCCH.

TABLE 3

| Type | Identifier | Description |
| --- | --- | --- |
| UE-specific | C-RNTI, temporary C-RNTI, semi-persistent C-RNTI | used for a unique UE Identification |
| Common | P-RNTI | used for paging message |
|  | SI-RNTI | used for system information |
|  | RA-RNTI | used for random access response |

If a C-RNTI, a temporary C-RNTI or a semi-persistent C-RNTI is used, the PDCCH carries UE-specific control information and, if another RNTI is used, the PDCCH carries common control information received by all UEs within a cell. In step S420, the control information to which the CRC is attached is subjected to channel coding so as to generate coded data. In step S430, rate matching according to a CCE aggregation level allocated to a PDCCH format is performed. In step S440, the coded data is modulated so as to generate modulated symbols. The modulated symbols configuring one PDCCH may have one of CCE aggregation levels of 1, 2, 4 and 8. In step S450, the modulated symbols (CCEs) are mapped to REs.

Figure 5:
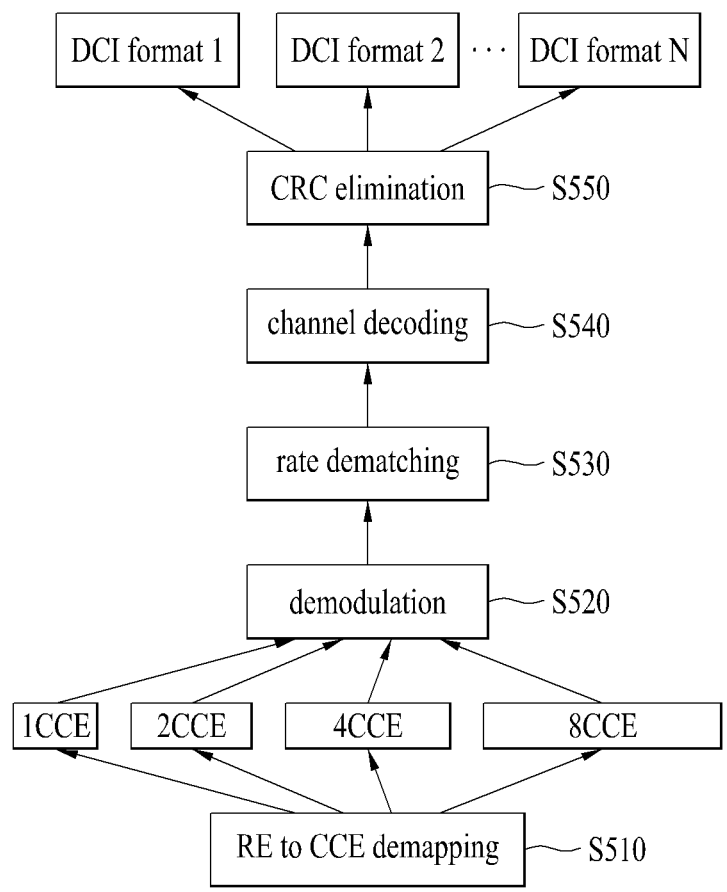
FIG. 5 is a flowchart illustrating a process for receiving a PDCCH by a user equipment (UE).

FIG. 5 is a flowchart illustrating a method of processing a PDCCH at a UE.

Referring to FIG. 5, in step S510, the UE demaps physical REs to CCEs. In step S520, since the UE is not aware of a CCE aggregation level, at which the UE receives a PDCCH, demodulation is performed with respect to the CCE aggregation levels. In step S530, the UE performs rate dematching with respect to the demodulated data. Since the UE is not aware of a DCI format (or a DCI payload size) of control information to be received, rate dematching is performed with respect to each DCI format (or each DCI payload size). In step S540, the data subjected to rate dematching is subjected to channel decoding according to a code rate and a CRC is checked to detect whether errors occur. If errors do not occur, it is determined that the UE detects a PDCCH thereof. If errors occur, the UE continues to perform BD with respect to other CCE aggregation levels or other DCI formats (or DCI payload sizes). In step S550, the UE which detects the PDCCH removes the CRC from the decoded data and acquires control information.

A plurality of PDCCHs for a plurality of UEs may be transmitted within a control region of the same subframe. The base station (BS) does not provide a UE with information about the position of a PDCCH in the control region. Accordingly, the UE monitors a set of PDCCH candidates and finds a PDCCH thereof. Monitoring refers to attempts to decode the received PDCCH candidates at the UE according to DCI formats. This is referred to as blind decoding (blind detection). Through blind decoding, the UE identifies the PDCCH transmitted thereto and, at the same time, decodes the control information transmitted through the PDCCH. For example, in the case in which the PDCCH is demasked with a C-RNTI, the UE may detect the PDCCH when CRC errors do not occur.

In order to reduce overhead of blind decoding, the number of DCI formats is defined to be less than the number of kinds of control information transmitted using the PDCCH. The DCI information includes a plurality of different information fields. The kind of each information field, the number of information fields, the bit number of each information field, etc. are changed according to DCI format. In addition, the size of the control information matching the DCI format is changed according to DCI format. An arbitrary DCI format may be used to transmit two or more kinds of control information.

Table 4 shows an example of control information transmitted in DCI format 0. In the following description, the bit size of each information field is only exemplary and is not limited thereto.

TABLE 4

| Information Field | bit(s) |
| --- | --- |
| (1) Flag for format0/format1A differentiation | 1 |
| (2) Hopping flag | 1 |
| (3) Resource block assignment and hopping resource A1 location | $\lceil \log_2(N_{RB}^{UL}(N_{RB}^{UL}+1)/2) \rceil$ |
| (4) Modulation and coding scheme and redundancy Version | 5 |
| (5) New data indicator | 1 |
| (6) TPC command for scheduled PUSCH | 2 |
| (7) Cyclic shift for DN RS | 3 |
| (8) UL index (TDD) | 2 |
| (9) CQI request | 1 |

The flag field is an information field for distinguishing between format 0 and format 1A. That is, DCI format 0 and 1A have the same payload size and are distinguished by the flag field. The bit size of the resource block allocation and hopping resource allocation field may be changed according to a hopping PUSCH or a non-hopping PUSCH. The resource block allocation and hopping resource allocation field for the non-hopping PUSCH provides $\lceil \log_2(N_{RB}^{UL}(N_{RB}^{UL}+1)/2) \rceil$ bits to resource allocation of a first slot within an uplink subframe. Here, $N_{RB}^{UL}$ is the number of resource blocks included in an uplink slot and depends on an uplink transmission bandwidth set in a cell. Accordingly, the payload size of DCI format 0 may be changed according to uplink bandwidth. DCI format 1A includes an information field for PDSCH allocation and the payload size of DCI format 1A may also be changed according to downlink bandwidth. DCI format 1A provides a reference information bit size for DCI format 0. Accordingly, if the number of information bits of DCI format 0 is less than the number of information bits of DCI format 1A, "0" is added to DCI format 0 until the payload size of DCI format 0 becomes equal to the payload size of DCI format 1A. The added "0" is filled in a padding field of the DCI format.

Figure 6:
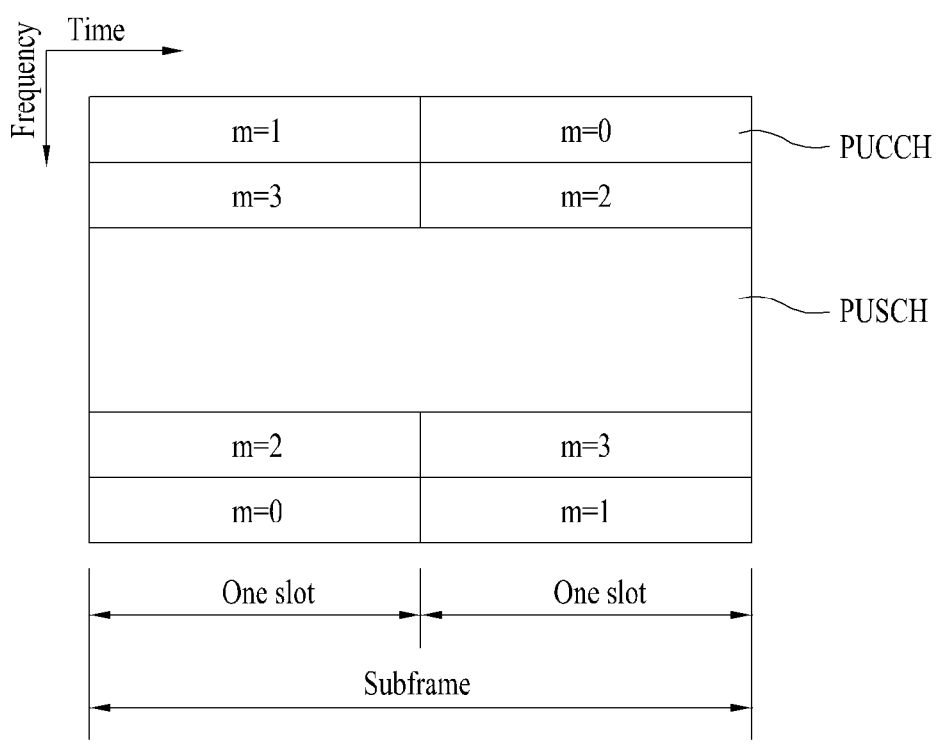
FIG. 6 exemplarily shows an uplink (UL) subframe structure.

FIG. 6 is a diagram showing the structure of an uplink subframe used in LTE.

Referring to FIG. 6, the uplink subframe includes a plurality of slots (e.g., two). The number of SC-FDMA symbols included in one slot may be changed according to the length of a CP. For example, in the case of the normal CP, the slot may include seven SC-FDMA symbols. The uplink subframe is divided into a data region and a control region in a frequency domain. The data region includes a PUSCH and is used to transmit a data signal such as voice data. The control region includes a PUCCH and is used to transmit control information. The PUCCH includes RB pairs (e.g., m=0, 1, 2, 3) located at both ends of the data region on a frequency axis and hops between slots. The control information includes HARQ ACK/NACK, channel quality information (CQI), precoding matrix indicator (PMI), rank indication (RI), etc.

Figure 7:
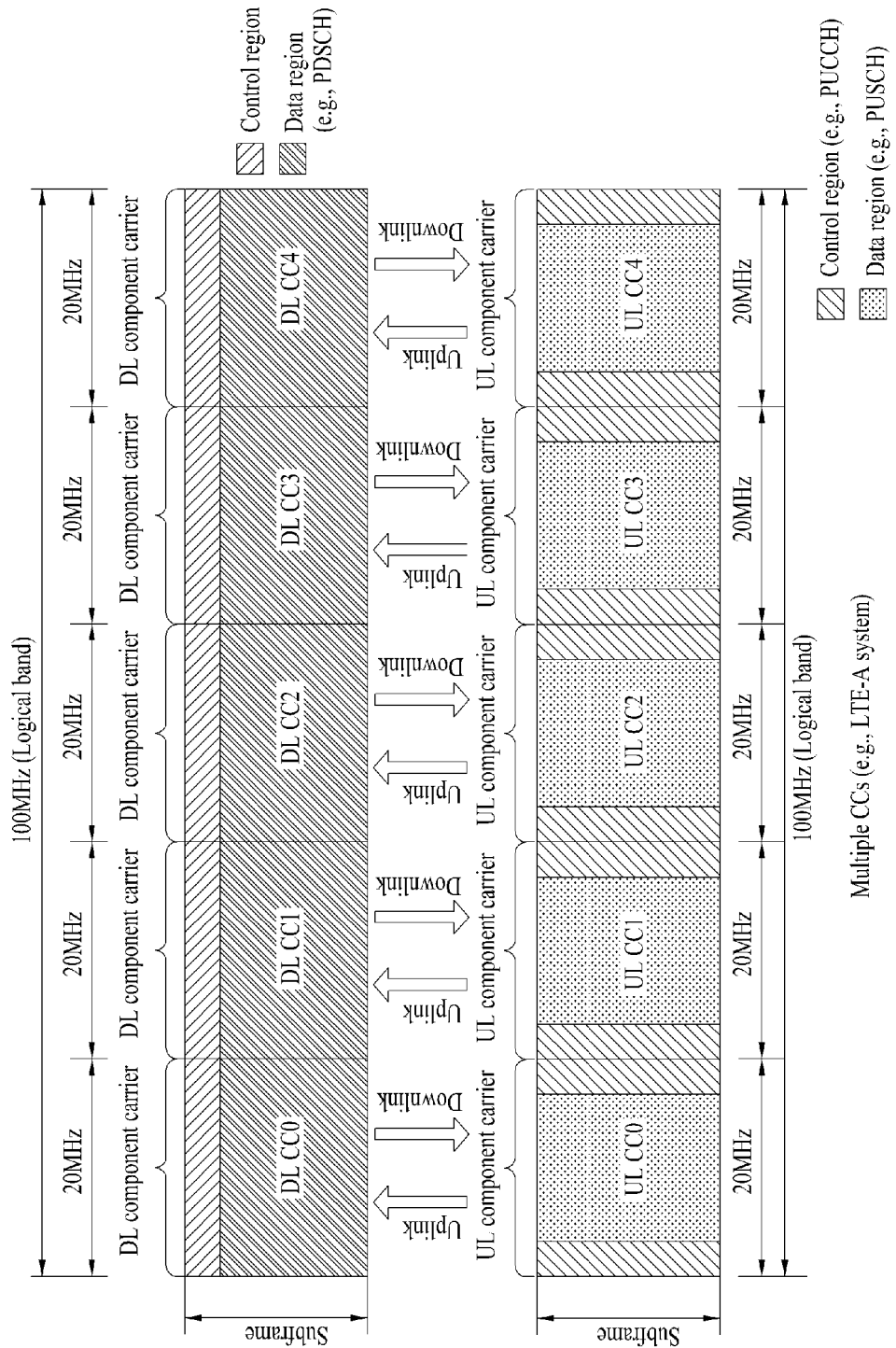
FIG. 7 exemplarily shows a carrier aggregation (CA) communication system.

FIG. 7 is a diagram showing a carrier aggregation (CA) communication system.

Referring to FIG. 7, a plurality of uplink/downlink Component Carriers (CCs) may be aggregated so as to support a wider uplink/downlink bandwidth. The term "CC" may be replaced with other equivalent terms (e.g., carrier, cell and the like). The CCs may be contiguous or non-contiguous in a frequency domain. The bandwidths of the CCs are independently set. Asymmetric CA in which the number of UL CCs and the number of DL CCs are different is also possible. The control information may be set to be transmitted/received only through a specific CC. Such a specific CC may be referred to as a primary CC (or anchor CC) and the remaining CCs may be referred to as secondary CCs.

For example, if cross-carrier scheduling (or cross-CC scheduling) is applied, a PDCCH for downlink allocation may be transmitted through DL CC#0 and a corresponding PDSCH may be transmitted through DL CC#2. For cross-carrier scheduling, a carrier indicator field (CIF) is used. Setting presence/absence of the CIF in the PDCCH may be enabled through higher layer signaling (e.g., RRC signaling) in a semi-static and UE-specific (or UE-group-specific) manner. The basic matters (baselines) of PDCCH transmission are summarized as follows.

CIF disabled: A PDCCH on a DL CC is allocated PDSCH resources on the same DL CC and PUSCH resources on a single linked UL CC.

No CIF

Identical to LTE PDCCH structure (same coding, same CCE-based resource mapping) and DCI format CIF enabled: A PDCCH on a DL CC may be allocated PDSCH or PUSCH resources on one of a plurality of aggregated DL/UL CCs using a CIF.

LTE DCI format extended to have a CIF

CIF (if set) is a fixed x-bit field (e.g., x=3)

The position of the CIF (if set) may be fixed regardless of a DCI format size.

LTE PDCCH structure is reused (same coding, same CCE-based resource mapping)

If the CIF is present, a base station (BS) may allocate a monitoring DL CC set in order to reduce BD complexity of a UE. A PDCCH monitoring DL CC set is a part of all the aggregated DL CCs and includes one or more DL CCs, and a UE may detect/decode a PDCCH only in a corresponding DL CC. In other words, if the base station (BS) performs PDSCH/PUSCH scheduling, the PDCCH is transmitted only through the PDCCH monitoring DL CC set. The PDCCH monitoring DL CC set may be set in a UE-specific, UE-group-specific or cell-specific manner. The term "PDCCH monitoring DL CC" may be replaced with equivalent terms "monitoring carrier", "monitoring cell", etc. In addition, the term "aggregated CC" for a UE may be replaced with terms such as "serving CC", "serving carrier", "serving cell", etc.

Figure 8:
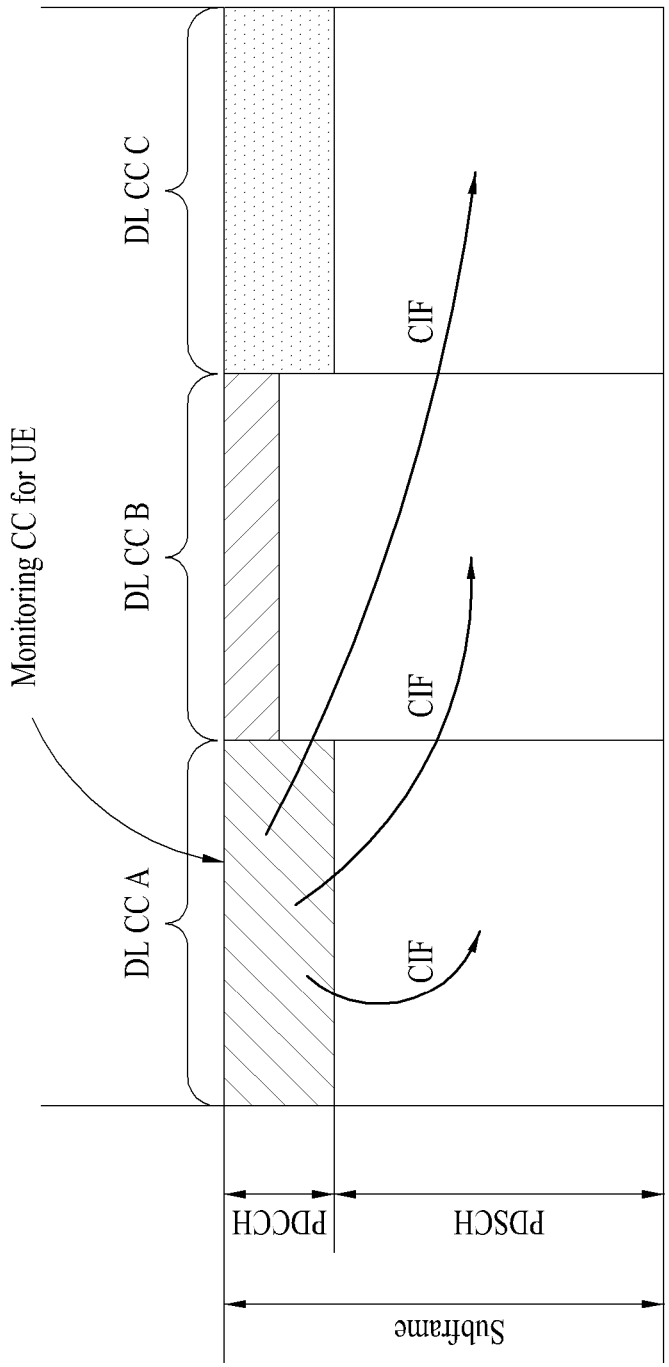
FIG. 8 exemplarily shows scheduling for use in an aggregate of multiple carriers.

FIG. 8 illustrates scheduling when a plurality of carriers is aggregated. It is assumed that 3 DL CCs are aggregated and DL CC A is set to a PDCCH monitoring DL CC. DL CC A, DL CC B and DL CC C may be called serving CCs, serving carriers, serving cells, etc. In case of CIF disabled, each DL CC may transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) may transmit not only a PDCCH that schedules the PDSCH corresponding to the DL CC A but also PDCCHs that schedule PDSCHs of other DL CCs. In this case, no PDCCH is transmitted in DL CC B and DL CC C not established as PDCCH monitoring DL CCs. Therefore, DL CC A (monitoring DL CC) must include all of a PDCCH search space related to DL CC A, a PDCCH search space related to DL CC B, and a PDCCH search space related to DL CC C. According to the embodiments of the present invention, it is assumed that the PDCCH search space is defined per carrier.

As described above, LTE-A considers utilizing the CIF in a PDCCH for cross-CC scheduling. Information as to whether the CIF is used (i.e., support of a cross-CC scheduling mode or a non-cross-CC scheduling mode) and switching between modes may be semi-statically or UE-specifically established through RRC signaling. After performing the corresponding RRC signaling process, the UE may recognize whether the CIF is used in a PDCCH to be scheduled in the UE.

Figure 9:
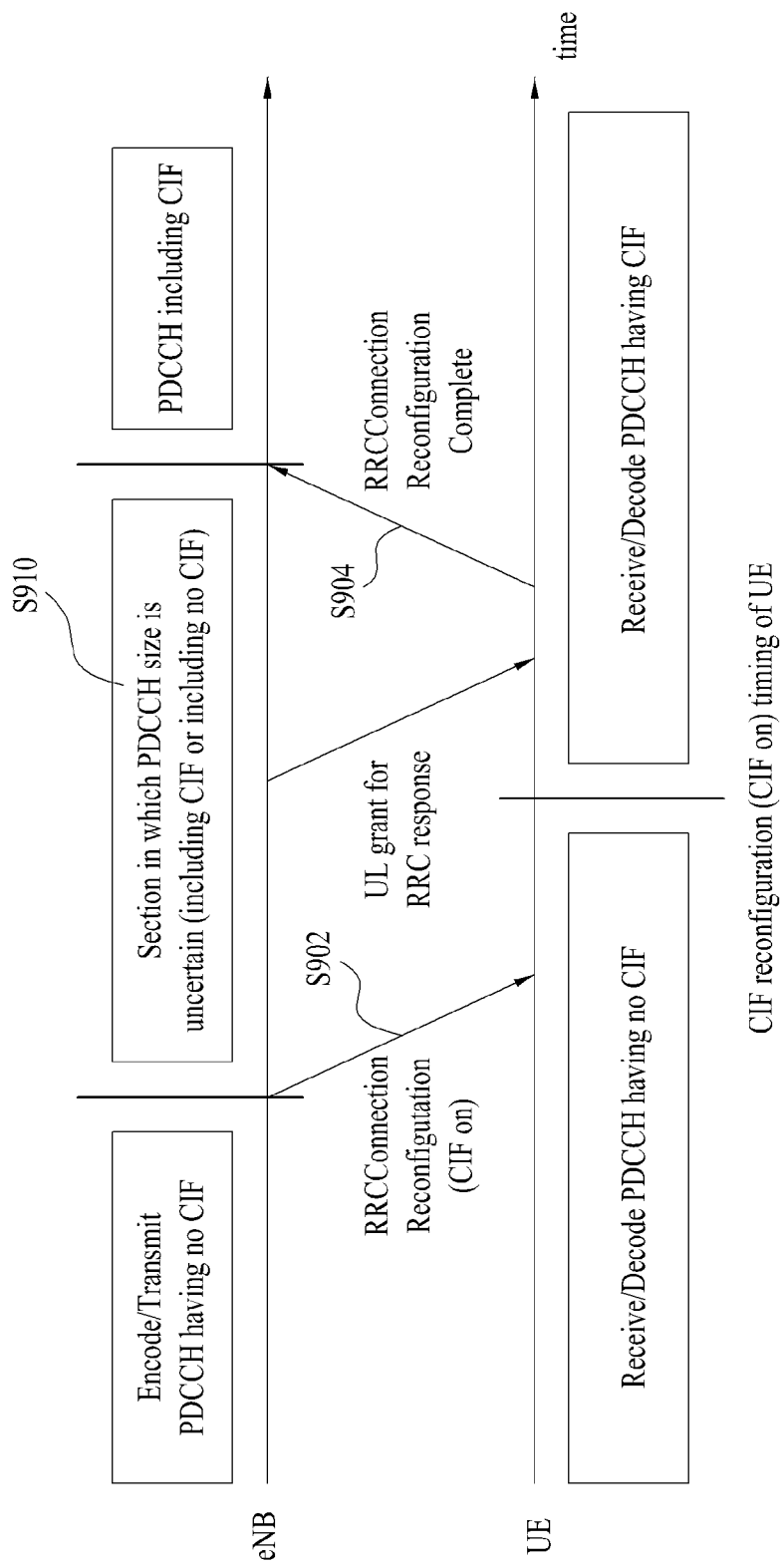
FIG. 9 exemplarily shows BS and UE operations for use in a CIF reconfiguration section.

FIG. 9 exemplarily shows BS (or eNB) and UE operations for use in a CIF reconfiguration section. FIG. 9 assumes a reconfiguration situation in which the CIF is first switched off and then switched on.

Referring to FIG. 9, the base station (BS) transmits an RRC command (e.g., "RRCConnectionReconfiguration" command), that transmits a CIF reconfiguration message to the corresponding UE, to the UE, such that the base station (BS) can establish information as to whether the CIF is used in a PDCCH into the corresponding UE (Step S904).

The UE transmits the received RRC command to its own RRC layer. Upon receiving the RRC command from the base station (BS), the UE transmits an RRC response message (e.g., "RRCConnectionReconfigurationComplete" message) carrying the CIF reconfiguration complete message to the base station (BS) through the RRC layer (Step S904).

Meanwhile, in the RRC signaling section 910, a start time at which CIF reconfiguration (i.e., CIF on/off) starts may be different between the BS and the UE, such that there is little possibility of generating an unexpected error or malfunction not only in the BS PDCCH transmission but also in the UE reception/decoding process. In other words, there is a possibility that the BS and the UE mat differently recognize whether the CIF is used in the same PDCCH at a specific time point of the RRC signaling section 910. For example, the BS may transmit a PDCCH without using the CIF, and the BS may receive/decode the corresponding PDCCH using the CIF. In addition, the BS transmits a PDCCH after inserting the CIF, and the UE may receive/decode the corresponding PDCCH without using the CIF. Such malfunction may cause unnecessary overhead in PDCCH transmission/reception between the BS and the UE, and may also increase a scheduling time delay.

Under the condition that multiple CCs are aggregated and cross-carrier scheduling is performed, a method for efficiently allocating a control channel and a method for constructing a search space will hereinafter be described in detail. Prior to describing the following description, it should be noted that transmission modes for use in aggregated CCs may be established independently of each other, and a bandwidth is allocated to each CC, such that the same or different bandwidths may be used. From among all the aggregated CCs for each UE (group), one or more DL CCs may be established as a PDCCH monitoring DL CC for the corresponding UE (group). In addition, similarly to the legacy LTE, the present invention assumes that BD for two DCI formats can be carried out in each PDCCH candidate, the scope or spirit of the present invention is not limited thereto. If necessary, BD for either at least one DCI format or at least three DCI formats for each PDCCH candidate can be carried out in each PDCCH candidate.

Embodiment 1

Method for Solving Ambiguity of Detected Control Channel

In LTE-A, a method for employing the CIF in a PDCCH so as to perform cross-CC scheduling using aggregated CCs has been used. However, in order to prevent the increase of additional blind decoding (BD) of a DCI format size added by both backward compatibility with legacy LTE UEs and the use of CIF, a method for disusing the CIF in a common SS has been used.

On the other hand, a DCI format (hereinafter referred to as DCI format A) having no CIF established in a common SS on a single DL CC may have the same size as a DCI format (hereinafter referred to as DCI format B) that employs a CIF established in a UE-specific SS. A DCI format size refers to a DCI (payload) size. The DCI (payload) size may or may not include a CRC size according to definition. For example, the DCI format size may be changed according to a frequency band of a CC. DCI format A and DCI format B may have the same or different formats. For convenience of description, the above-mentioned DCI formats A/B will hereinafter be referred to as the same-size DCI format (or the same-size DCI format or the same size DCI) between SSs. Preferably, the present invention may be limited to the case in which the same-size DCI formats may be CRC-masked (or scrambled) using the same RNTI. For convenience of description, it is assumed that a CRC for use in the same-size DCI format is masked (or scrambled) with the same RNTI.

Meanwhile, under the condition that a common SS and a UE-specific SS are overlapped with each other due to a certain reason (for example, SS allocation rule, SS hopping rule, etc.) and the same-size DCI format succeeds in DCI format decoding in the overlap region, the UE cannot discriminate which SS schedules the successfully-decoded PDCCH (i.e., the UE cannot discriminate between a PDCCH including the CIF and a PDCCH having no CIF).

Various methods for solving the above-mentioned problems will hereinafter be described with reference to the attached drawings. Although the following description exemplarily shows that a common SS (no CIF) overlaps a UE-specific SS (CIF), the present invention may be generalized in an exemplary case in which an SS including no CIF overlaps an SS equipped with a CIF.

Method 1-1: Search Space Shift

In Method 1-1, under the condition that a common SS not utilizing the CIF and a UE-specific SS utilizing the CIF have the same DCI format size, and the common SS and the UE-specific SS are overlapped with each other according to the predefined SS allocation/hopping rules, a method for shifting a UE-specific SS so as not to generate the overlap region is proposed in Method 1-1. Preferably, the same-size DCI format may be CRC-scrambled with the same RNTI.

FIGS. 10A to 10D exemplarily show that a UE-specific SS is shifted at four CCE aggregation levels (L=1, 2, 4, 8). In FIGS. 10A to 10D, CCE may be limited to a CCE capable of being used as a PDCCH candidate in the corresponding CCE aggregation level.

Referring to FIGS. 10A to 10D, an overlap region between the common SS and the UE-specific SS may occur at the left or right side on the basis of the common SS. Since the UE-specific SS is shifted, the overlap region is prevented from being generated. As shown in FIGS. 10A to 10D, the UE-specific SS may move in the direction for minimizing the number of shifted CCEs. The shift size (i.e., the number of CCEs) may be a minimum number of CCEs (or a predetermined value may also be added to the minimum number of CCEs) for preventing the occurrence of the overlap region. On the other hand, assuming that the number of shifted CCEs is identical in both directions of the common SS as shown in FIG. 10C (L=4), the UE-specific SS may move in a predetermined direction (e.g., to the right). The number of shifted CCEs may be determined in consideration of only CCEs capable of being used as PDCCH candidates in the corresponding CCE aggregation level.

In another method, a shift direction of the UE-specific SS and the number of shifted CCEs may be predetermined between the BS (eNB) and the UE, regardless of the position/size of the overlap region. For example, the shift direction of the UE-specific SS may be determined to be the right direction (or left direction) or may be close to a common SS boundary. In addition, the number of shifted CCEs may be identical to or higher than a total number of CCEs (e.g., 16 CCEs) of a common SS. In this case, the shift direction of the UE-specific SS and the number of shifted CCEs may be promised between the BS and the UE, or may be determined by the BS (eNB) through signaling. In addition, some information may be predetermined, and the remaining information may be indicated through signaling. Such signaling for the above-mentioned operation may be carried out using RRC signaling or L1/L2 signaling (e.g., MAC signaling, PDCCH, etc.)

The above-mentioned description shows that all of the UE-specific SSs are shifted, under the condition that DCI formats established in the common SS (including no CIF) and the UE-specific SS (including CIF) are identical in size and the common SS overlaps the UE-specific SS. However, the present invention may also apply the above-mentioned method only to a UE-specific SS region of a specific part actually overlapped with the common SS, instead of to the entire UE-specific SS.

Method 1-2: Limiting Search Space Start Point

Method 1-2 provides, under the condition that a DCI format size established in a common SS not utilizing a CIF is identical to a DCI format size established in a UE-specific SS utilizing the CIF, a method for establishing a start point (i.e., start CCE) of the UE-specific SS so as to prevent an overlap region from occurring between two SSs.

Figure 11:
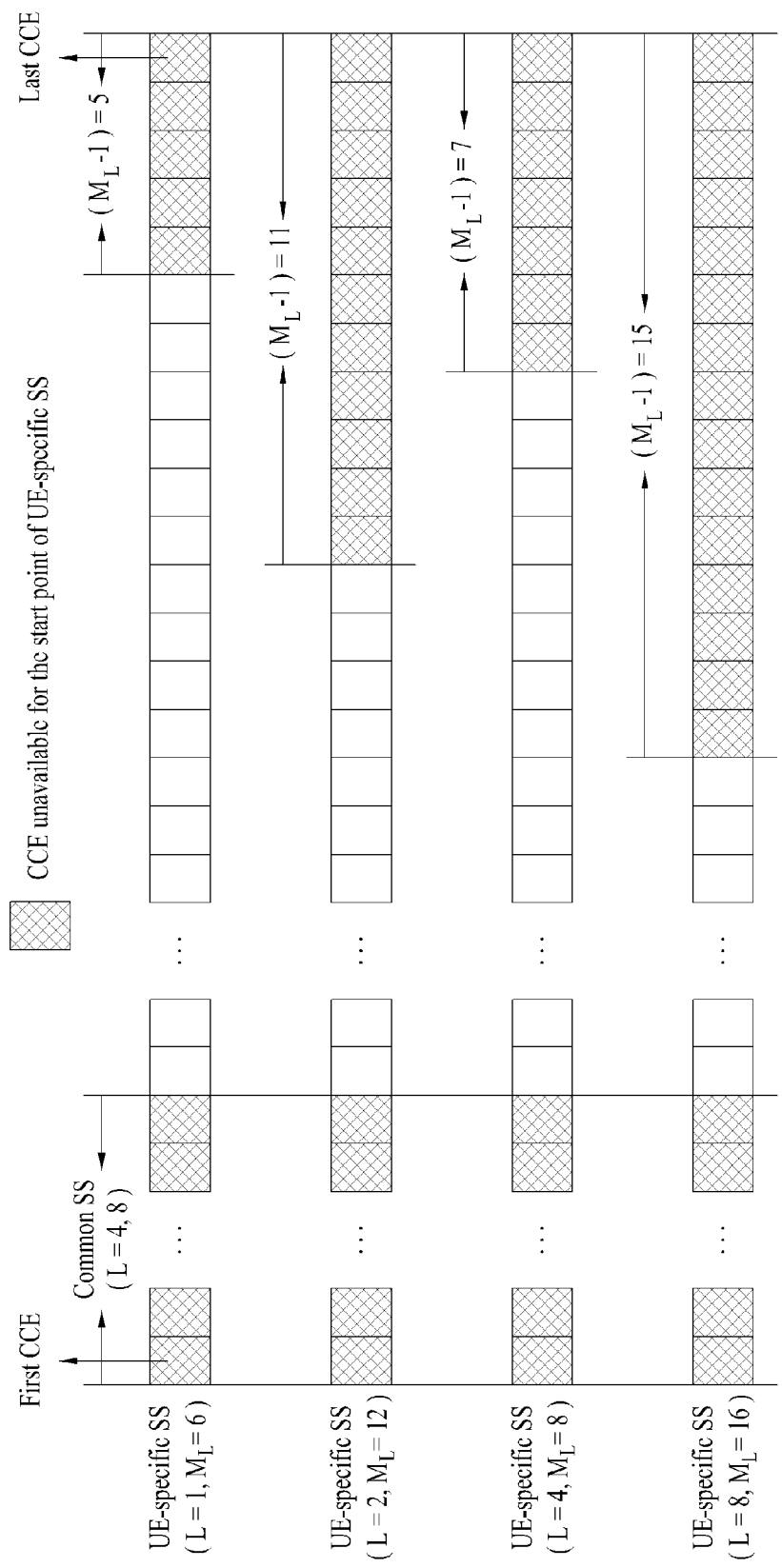
FIG. 11 exemplarily shows another method for overcoming ambiguity encountered in control channel reception according to one embodiment of the present invention.

FIG. 11 exemplarily shows a method for limiting a start point of a UE-specific SS at each of four CCE aggregation levels (Ls) (where L=1, 2, 4, 8). The common SS assumes that the CCE aggregation level is set to 4 or 8. A total number of CCEs constructing a PDCCH candidate at each CCE aggregation level (L) of the UE-specific SS is denoted by $M_L$.

Referring to FIG. 11, if a DCI format size of the common SS (including no CIF) is identical to that of the UE-specific SS (including CIF), and if the DCI format is preferably CRC-scrambled with the same RNTI, CCEs (16 CCEs) contained in the common SS and the last ($M_L-1$) CCEs located on CCE indexes are not allocated to the start points of the corresponding UE-specific SS. In this case, CCE may be limited to CCEs capable of being used as a PDCCH candidate at the corresponding CCE aggregation level. For convenience of description, it is assumed that the $M_L$ value for constructing the UE-specific SS in LTE is used without change. In LTE, numbers of PDCCH candidates at L=1, 2, 4, 8 are respectively set to 6, 6, 2, 2, resulting in $M_L$=6, 12, 8, 16. If the start point of the UE-specific SS is established by the proposed method, no overlap region occurs between two SSs CRC-scrambled with the same RNTI.

Method 1-1 or 1-2 is not limited to the case in which the DCI format size of the common SS is identical to that of the UE-specific SS. In order to protect the limited common SS region, it is possible to prevent an overlap region from occurring between two SSs irrespective of the DCI format size established in the two SSs. In addition, several UE-specific SSs for scheduling several CCs may be present in a single DL CC. If a DCI format size of a UE-specific SS not utilizing a CIF is identical to that of a UE-specific SS utilizing the CIF and two SSs are overlapped with each other, Method 1-2 may shift any one of UE-specific SS (e.g., a UE-specific SS utilizing the CIF) so as to prevent the occurrence of the overlap region in a similar way to the proposed method, or may limit the start point of any UE-specific SS so as to prevent the overlap region from occurring between two SSs.

Method 1-3: Limitation of DCI Transmission

Method 1-3 proposes a method for limiting control channel (or DCI) transmission in a common SS and a UE for the same, under the condition that there is a possibility of causing ambiguity of a control channel (or control information) either in a common SS not utilizing a CIF or in a UE-specific SS utilizing the CIF.

Figure 12:
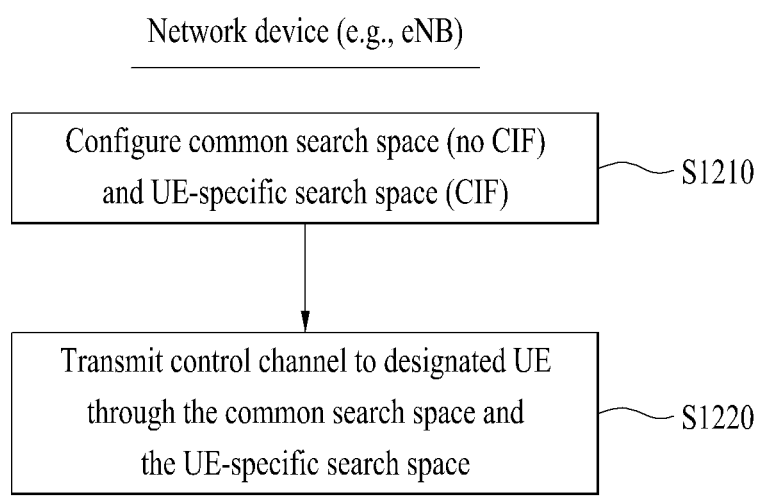
FIGS. 12 to 19 exemplarily show another method for overcoming ambiguity encountered in control channel reception according to one embodiment of the present invention.

FIG. 12 shows an example in which a network apparatus (e.g., BS or eNB) transmits a control channel.

Referring to FIG. 12, the BS (eNB) configures a common SS and one or more UE-specific SSs in step S1210. Each SS includes a set of control channel candidates. SS configuration is carried out by a process for determining control channel allocation. The process for determining the control channel allocation may include a process for determining PDCCH allocation. By the process for determining PDCCH allocation, SS size (e.g., the number of CCEs), a CCE aggregation level of a PDCCH candidate, the location of SS, etc. may be determined. In this example, a control channel candidate of the common SS does not include a CIF field, and a control channel candidate of a UE-specific SS includes the CIF field. Each UE-specific SS is configured per CC. One control information format may be established per DL CC or UL CC of the search space. Two or more control information formats may be established per DL CC or UL CC. In addition, DL/UL common control information format may be established in the search space in the same manner as in DCI formats 0/1A of the LTE. The search space configuration scheme may be based on the scheme for constructing the PDCCH search space of the legacy LTE. However, parameters (for example, hashing pattern, position, size, etc.) of the search space for each CC may be obtained by a combination of a parameter related to a PDCCH search space of the legacy LTE and a CIF value. In this example, a common SS and at least one UE-specific SS may be received through the control region of the same subframe on the same DL CC (for example, anchor CC (or PCC) or monitoring CC). The common SS may overlap the UE-specific SS as necessary. The control channel includes a PDCCH and the control channel candidate includes a PDCCH candidate. The control channel carries a variety of control information, and a variety of control information formats may exist according to control information types/contents.

Thereafter, the BS (eNB) may transmit a control channel of a specific UE through a common SS and at least one UE-specific SS in step S1220. In this example, the common SS and at least one UE-specific SS may be transmitted through the same subframe on the same carrier. In more detail, the common SS and at least one UE-specific SS may be transmitted through a control region (that is, a maximum of 3 (or 4) contiguous OFDM symbols indicated by PCFICH) within the subframe. The control channel (or control information) may carry identification (ID) information to indicate the corresponding UE. The ID information may include RNTI (e.g., C-RNTI, SPS-RNTI, etc.). The control channel (or control information) may be scrambled using such ID information. For example, the BS (eNB) may transmit a PDCCH being CRC-scrambled with C-RNTI, to the UE. In this example, it is assumed that a control channel transmitted through a common SS and a control channel transmitted through the UE-specific SS are scrambled with the same RNTI.

On the other hand, there may be a possibility of causing ambiguity of a control channel (or control information) in each of the common SS and the UE-specific SS. If there is a possibility of causing ambiguity of the control channel, the common SS may overlap the UE-specific SS due to the SS allocation/hopping rules and the like. In addition, if there is a possibility of causing ambiguity of the control channel, a control channel candidate of the common SS (including no CIF) and a control channel candidate of the UE-specific SS (including CIF) have the same DCI format size (that is, DCI payload size), and the control channel candidates of two DDs may preferably have the same identifier (e.g., RNTI) and/or the same first CCE resource. In this case, the common search space according to Method 1-3 may limit control channel (or DCI) transmission in at least some parts of control channel candidates.

For example, if there is a possibility of causing ambiguity of a control channel in a common SS or a UE-specific SS, control channel (or DCI) transmission may be dropped from at least some parts of control channel candidates in the common search space. A region for limiting control channel (or DCI) transmission may be the entire common search space, overlap region(s) of the common search space, or some parts (or control channel resources (e.g., CCE) corresponding to the above-mentioned region) of such overlap regions. In this implementation example, limitation of control channel (or DCI) transmission may be achieved either in the process for allocating control channel resources to a DCI, or in an actual transmission process. In addition, according to the implementation example, limitation of control channel (or DCI) transmission may be achieved either through puncturing (or nulling) (i.e., a kind of rate matching) prior to resource mapping or through puncturing (or nulling) after such resource mapping. In summary, control channel (or DCI) transmission may be limited either in the case in which a first control channel candidate to be monitored by the common SS and a second control channel candidate to be monitored by the UE-specific SS have the same-size DCI format, or in the other case in which the first and second control channel candidates have the same ID (e.g., RNTI) and/or the same start resource (e.g., start CCE).

Figure 13:
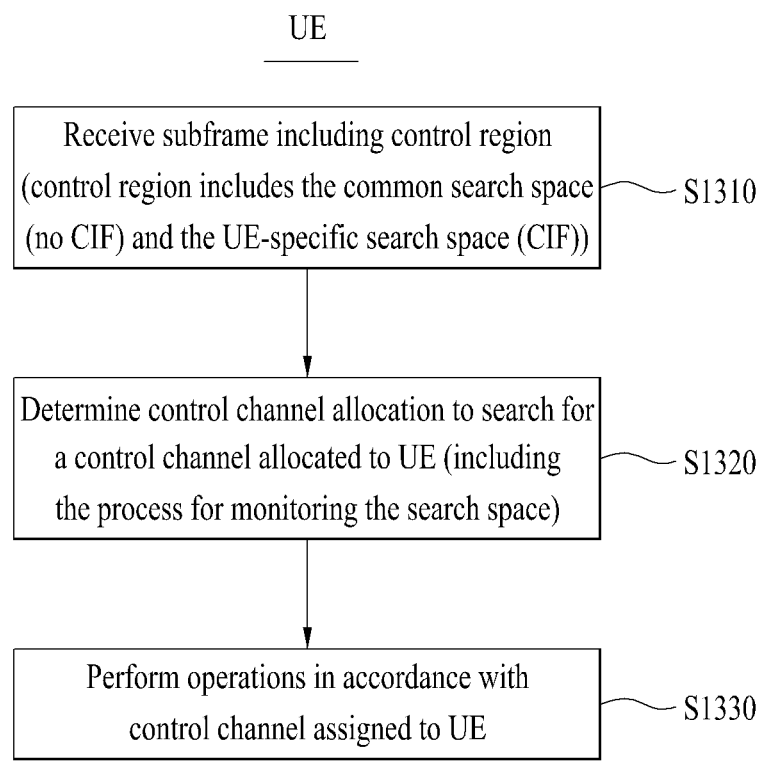

FIG. 13 shows an example for processing a control channel (PDCCH) by a UE. Steps shown in FIG. 13 may correspond to those of FIG. 12, and as such a detailed description thereof will refer to contents of FIG. 12.

Referring to FIG. 13, the UE receives a subframe including a control region in step S1310. The control region includes a common SS and at least one UE-specific SS, and each SS includes a set of control channel candidates. In this example, a control channel candidate of the common SS does not include the CIF field and a control channel candidate of the UE-specific SS includes the CIF field. Each UE-specific SS is configured per CC. Thereafter, in order to search for a control channel assigned to the UE, the UE may determine the process for determining control channel (e.g., PDCCH) allocation in step S1320. The process for determining control channel allocation may include the process for monitoring control channel candidates contained in the search space in consideration of various parameters (e.g., the SS size (e.g., the number of CCEs), a CCE aggregation level of the control channel candidate, the SS position, etc.) obtained by the predetermined rule in step S1320. The monitoring process may include the process for performing blind decoding (BD) of each control channel candidate. Thereafter, the UE may carry out the operations of a control channel assigned thereto in step S1330.

Meanwhile, there may be a possibility of causing ambiguity in a control channel (or control information) between the common SS and the UE-specific SS. In the case of constructing the SS under the condition that the possibility of causing ambiguity of a control channel exists, the common SS may overlap the UE-specific SS due to the SS allocation/hopping rules, etc. In addition, under the condition that the possibility of causing ambiguity of a control channel exists, a control channel candidate of the common SS (including no CIF) and a control channel candidate of the UE-specific SS (including CIF) have the same DCI format size (in other words, DCI payload size), and the control channel candidates of the two SSs may preferably include the same ID (or RNTI) and/or the same first CCE resource. In this case, according to this method, it is assumed that the UE limits control channel (or DCI) transmission in at least some of control channel candidates of the common search space. Under the above-mentioned assumption, the UE may perform the process for determining control channel allocation (more specifically, the monitoring process). In other words, the UE may perform the monitoring process on the assumption that a control channel (or DCI) is transmitted in a region for limiting control channel (DCI) transmission. The control channel (or DCI) transmission limitation region may be the entirety of a common search space, overlap regions of the common search space, or some parts (or control channel resource (e.g., CCE) corresponding to the above-mentioned region) of the overlap regions. In brief, the above-mentioned assumption of control channel (or DCI) transmission limitation may be achieved either in the case in which a first control channel candidate to be monitored by the common SS or a second control channel candidate to be monitored by the UE-specific SS may have the same-size DCI format, or in the other case in which the first and second control channel candidates may have the same ID (e.g., RNTI) and/or the same start resource (e.g., the same start CCE).

In the present invention, according to the implementation example, the UE may search for only a DCI format of the UE-specific SS in a transmission limitation region of the control channel (or DCI). For example, the UE may search for only one of the same-size DCI formats in a specific SS region of a specific time point. In other words, if the same DCI format size is established in two SSs, the UE may not perform the monitoring/BD process of the same-size DCI format established in the common SS of a specific SS region of a specific time point. In addition, according to the implementation example, it is assumed that the UE monitors both the common SS and the UE-specific SS according to the conventional procedure and then receives the corresponding PDCCH at the UE-specific SS under the condition that a control channel (e.g., PDCCH) is detected in a control channel (or DCI) transmission limitation region.

In order to limit transmission of the same-size DCI format in the common SS, the following three methods may be considered. For convenience of description, the same-size DCI format established in the common SS is referred to as DCI_css, and the same-size DCI format established in the UE-specific SS is referred to as DCI_uss. 'DCI_css' may include DCI format 0 and DCI format 1A, each of which does not include a CIF of the 3GPP LTE system.

Figure 14A:
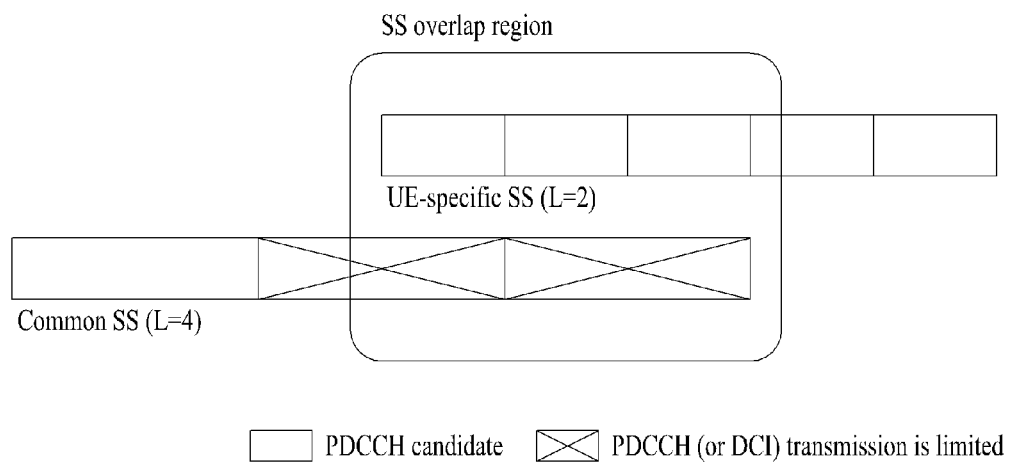
Figure 14B:
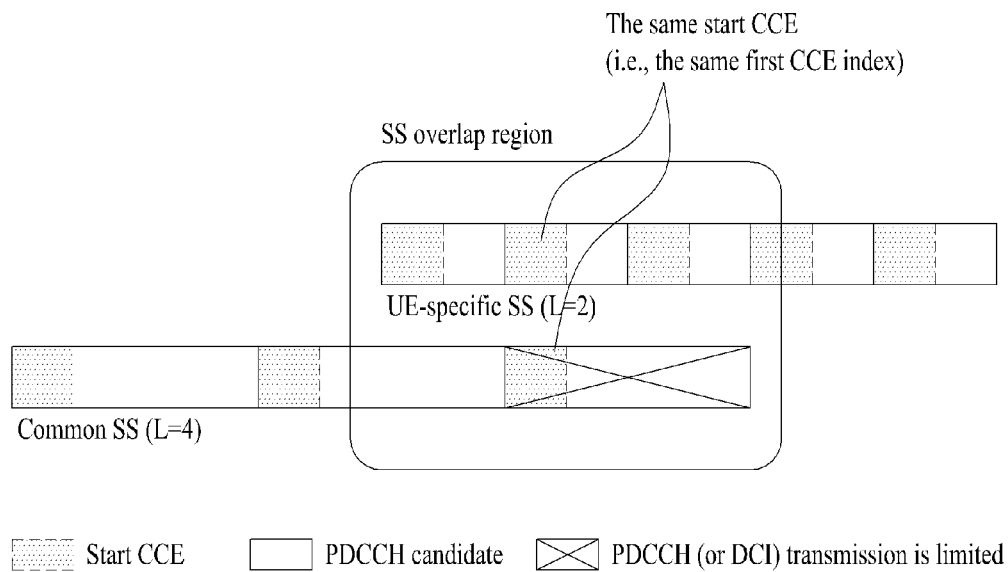
Figure 15:
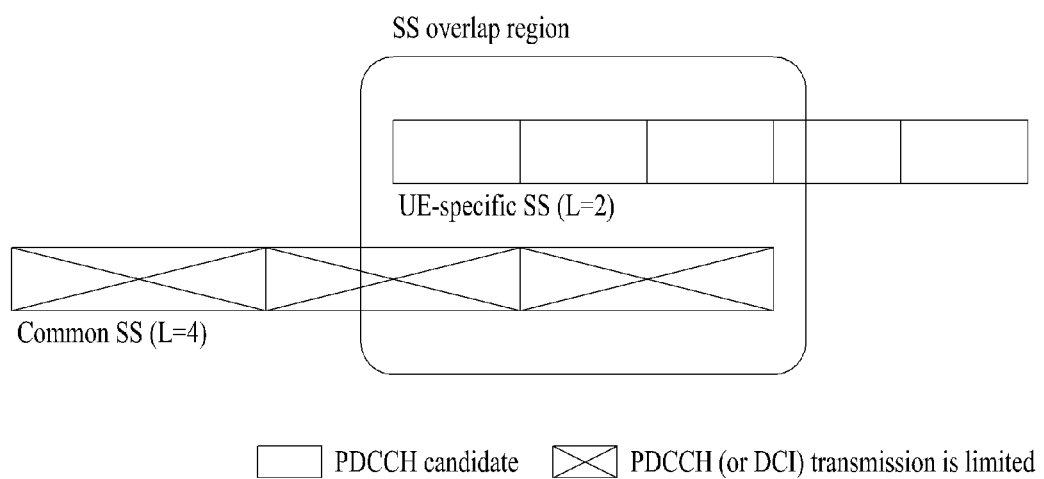

Case 1) Case 1 that is Applied Only to the Overlapped Common SS Region when the Overlap Region Occurs Between Two SSs The BS (eNB) does not transmit DCI_css only to the overlap region at a specific time at which the overlap region occurs between the common SS and the UE-specific SS. FIG. 14A exemplarily shows the search space structure according to one embodiment of the present invention. Therefore, it is assumed that the UE transmits a control channel in the overlap region only through the UE-specific SS. That is, if the control channel (or UCI) is detected in the overlap region, the UE considers that the corresponding control channel is received in the UE-specific SS. In accordance with the implementation example, in association with the same-size DCI formats at the corresponding time point, the UE may perform reception/BD of DCI_uss through the overlap region, and may perform reception/BD of DCI_css through a common SS other than the overlap region. In other words, the UE may not monitor a control channel candidate for DCI_css in the overlap region. In another example, the UE monitors all control channel candidates for DCI_css and DCI_uss in the overlap region. If a control channel is detected, the detected control channel is considered to be DCI_uss. The above-mentioned method of the present invention can allocate DCI_css to the common SS other than the overlap region, such that scheduling flexibility reduction in the common SS can be minimized.

Preferably, the present invention can limit transmission of the control channel candidates in the common SS only when a control channel candidate of the common SS and a control channel candidate of the UE-specific SS have the same DCI (payload) size, the same RNTI (e.g., CRC-scrambled) and the same start resource (e.g., CCE) in the overlap region. FIG.

14B exemplarily shows a search space configuration and control channel candidate transmission according to one embodiment of the present invention.

Case 2) Case 2 that is Applied to the Entire Common SS Region when Overlap Region Occurs Between Two SSs The BS (eNB) does not transmit DCI_css to the entire common SS region only at a time point at which the overlap occurs between the common SS and the UE-specific SS. Therefore, it is assumed that, if the overlap region occurs, a control channel is transmitted only in the overlap region through the UE-specific SS. That is, it is assumed that, if a control channel is detected in the overlap region, the corresponding control channel is received in the UE-specific SS. In accordance with the implementation example, in association with the same-size DCI formats at the corresponding time point, the UE cannot perform reception/BD of DCI_css through the entire common SS, and can perform reception/BD of DCI_uss through the overlap region. In another example, the UE monitors all control channel candidates for DCI_css and DCI_uss in the overlap region. If a control channel is detected, the detected control channel is considered to be DCI_uss. While the above-mentioned method can further reduce scheduling flexibility in the common SS, it can reduce complexity needed when the overlap region and the non-overlap region are distinguished from each other.

Preferably, the present invention can limit control channel candidate transmission in the entire common SS by monitoring control channel candidates including the same DCI (payload) size, the same RNTI (e.g. CRC-scrambled) and the same start resource (e.g., CCE) in the common SS and the UE-specific SS.

Case 3) Case 3 that is Applied to the Entire Common SS Region Irrespective of the Presence or Absence of the Overlap Region Irrespective of the presence or absence of the overlap region between two SSs, DCI_css is not transmitted to the entire common SS region. Therefore, in association with the same-size DCI formats in the entire period of the cross-CC scheduling mode, the UE cannot perform reception/BD of DCI_css through the entire common SS whereas the UE can perform reception/BD of DCI_uss in the overlap region. Overlap or non-overlap of the SS is changed per subframe, such that reduction of unnecessary scheduling flexibility is added even in the case in which the SS is not overlapped, and complexity needed when overlap or non-overlap must be checked per subframe can be greatly reduced.

In another example, if there is a possibility of causing ambiguity in a control channel (or control information) between the common SS not utilizing a CIF and the UE-specific SS utilizing the CIF, a method for limiting control channel (or DCI) transmission in the UE-specific SS and UE operations for the same are proposed.

Figure 16:
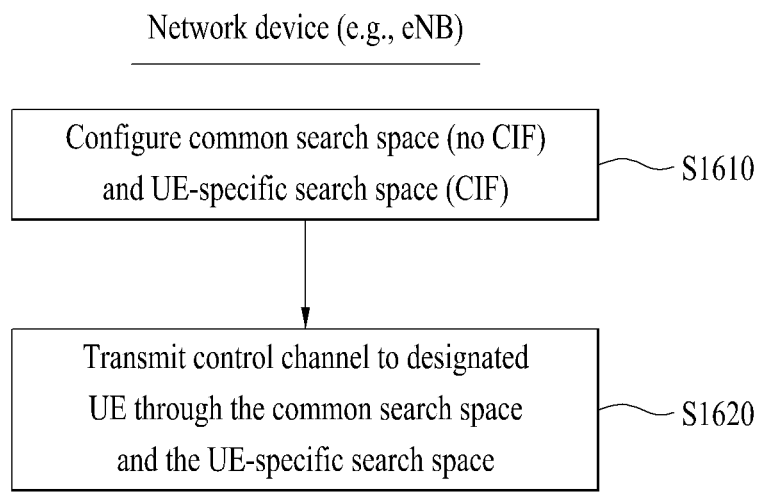

FIG. 16 shows an example in which the network device (e.g., eNB) transmits a control channel.

Referring to FIG. 16, the BS (eNB) configures a common SS and one or more UE-specific SSs in step S1610. Each SS includes a set of control channel candidates. SS configuration is carried out by a process for determining control channel allocation. The process for determining the control channel allocation may include a process for determining PDCCH allocation. By the process for determining PDCCH allocation, SS size (e.g., the number of CCEs), a CCE aggregation level of a PDCCH candidate, the location of SS, etc. may be determined. In this example, a control channel candidate of the common SS does not include a CIF field, and a control channel candidate of a UE-specific SS includes the CIF field. Each UE-specific SS is configured per CC. One control information format may be established per DL CC or UL CC of the search space. Two or more control information formats may be established per DL CC or UL CC. In addition, DL/UL common control information format may be established in the search space in the same manner as in DCI formats 0/1A of the LTE. The search space configuration scheme may be based on the scheme for constructing the PDCCH search space of the legacy LTE. However, parameters (for example, hashing pattern, position, size, etc.) of the search space for each CC may be obtained by a combination of a parameter related to a PDCCH search space of the legacy LTE and a CIF value. In this example, a common SS and at least one UE-specific SS may be received through the control region of the same subframe on the same DL CC. The common SS may overlap the UE-specific SS as necessary. The control channel includes a PDCCH and the control channel candidate includes a PDCCH candidate. The control channel carries a variety of control information, and a variety of control information formats may exist according to control information types/contents.

Thereafter, the BS (eNB) may transmit a control channel of a specific UE through a common SS and at least one UE-specific SS in step S1620. In this example, the common SS and at least one UE-specific SS may be transmitted through the same subframe on the same carrier. In more detail, the common SS and at least one UE-specific SS may be transmitted through a control region (that is, a maximum of 3 (or 4) contiguous OFDM symbols indicated by PCFICH) within the subframe. The control channel (or control information) may carry identification (ID) information to indicate the corresponding UE. The ID information may include RNTI (e.g., C-RNTI, SPS-RNTI, etc.). The control channel (or control information) may be scrambled using such ID information. For example, the BS (eNB) may transmit a PDCCH CRC-scrambled with C-RNTI, to the UE. In this example, it is assumed that a control channel transmitted through a common SS and a control channel transmitted through the UE-specific SS are scrambled with the same RNTI.

On the other hand, there may be a possibility of causing ambiguity of a control channel (or control information) in each of the common SS and the UE-specific SS. If there is a possibility of causing ambiguity of the control channel, the common SS may overlap the UE-specific SS due to the SS allocation/hopping rules and the like. In addition, if there is a possibility of causing ambiguity of the control channel, a control channel candidate of the common SS (including no CIF) and a control channel candidate of the UE-specific SS (including CIF) have the same DCI format size (that is, DCI payload size), and the control channel candidates of two DDs may preferably have the same identifier (e.g., RNTI) and/or the same first CCE resource. In this case, the common search space according to Method 1-3 may limit control channel (or DCI) transmission in at least some parts of control channel candidates.

For example, if there is a possibility of causing ambiguity of a control channel in a common SS or a UE-specific SS, control channel (or DCI) transmission may be dropped from at least some parts of control channel candidates in the UE-specific search space. A region for limiting control channel (or DCI) transmission may be the entire common search space, overlap region(s) of the common search space, or some parts (or control channel resources (e.g., CCE) corresponding to the above-mentioned region) of such overlap regions. In this implementation example, limitation of control channel (or DCI) transmission may be achieved either in the process of allocating control channel resources to a DCI, or in an actual transmission process. In addition, according to the implementation example, limitation of control channel (or DCI) transmission may be achieved either through puncturing (or nulling) (i.e., a kind of rate matching) prior to resource mapping or through puncturing (or nulling) after such resource mapping. In summary, control channel (or DCI) transmission may be limited either in the case in which a first control channel candidate to be monitored by the common SS and a second control channel candidate to be monitored by the UE-specific SS have the same-size DCI format, or in the other case in which the first and second control channel candidates have the same ID (e.g., RNTI) and/or the same start resource (e.g., start CCE).

Figure 17:
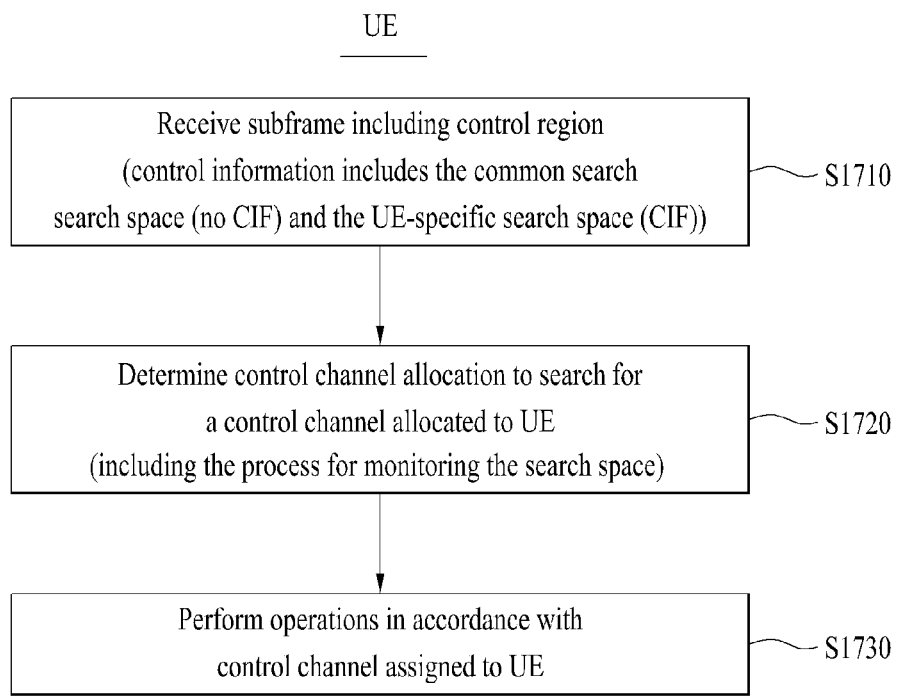

FIG. 17 shows an example for processing a control channel (PDCCH) by a UE. Steps shown in FIG. 17 may correspond to those of FIG. 16, and as such a detailed description thereof will refer to contents of FIG. 16.

Referring to FIG. 17, the UE receives a subframe including a control region in step S1710. The control region includes a common SS and at least one UE-specific SS, and each SS includes a set of control channel candidates. In this example, a control channel candidate of the common SS does not include the CIF field and a control channel candidate of the UE-specific SS includes the CIF field. Each UE-specific SS is configured per CC. Thereafter, in order to search for a control channel assigned to the UE, the UE may determine the process for determining control channel (e.g., PDCCH) allocation in step S1720. The process for determining control channel allocation may include the process for monitoring control channel candidates contained in the search space in consideration of various parameters (e.g., the SS size (e.g., the number of CCEs), a CCE aggregation level of the control channel candidate, the SS position, etc.) obtained by the predetermined rule in step S1720. The monitoring process may include the process for performing blind decoding (BD) of each control channel candidate. Thereafter, the UE may carry out the operations of a control channel assigned thereto in step S1730.

Meanwhile, there may be a possibility of causing ambiguity in a control channel (or control information) between the common SS and the UE-specific SS. In the case of constructing the SS under the condition that the possibility of causing ambiguity of a control channel exists, the common SS may overlap the UE-specific SS due to the SS allocation/hopping rules, etc. In addition, under the condition that the possibility of causing ambiguity of a control channel exists, a control channel candidate of the common SS (including no CIF) and a control channel candidate of the UE-specific SS (including CIF) have the same DCI format size (in other words, DCI payload size), and the control channel candidates of the two SSs may preferably include the same ID (or RNTI) and/or the same first CCE resource. In this case, according to this method, it is assumed that the UE limits control channel (or DCI) transmission in at least some of control channel candidates of the common search space. Under the above-mentioned assumption, the UE may perform the process for determining control channel allocation (more specifically, the monitoring process). In other words, the UE may perform the monitoring process on the assumption that a control channel (or DCI) is transmitted in a region for limiting control channel (DCI) transmission. The control channel (or DCI) transmission limitation region may be the entirety of a common search space, overlap regions of the common search space, or some parts (or control channel resource (e.g., CCE) corresponding to the above-mentioned region) of the overlap regions. In brief, the above-mentioned assumption of control channel (or DCI) transmission limitation may be achieved either in the case in which a first control channel candidate to be monitored by the common SS or a second control channel candidate to be monitored by the UE-specific SS may have the same-size DCI format, or in the other case in which the first and second control channel candidates may have the same ID (e.g., RNTI) and/or the same start resource (e.g., the same start CCE).

In the present invention, according to the implementation example, the UE may search for only a DCI format of the UE-specific SS in a transmission limitation region of the control channel (or DCI). For example, the UE may search for only one of the same-size DCI formats in a specific SS region of a specific time point. In other words, if the same DCI format size is established in two SSs, the UE may not perform the monitoring/BD process of the same-size DCI format established in the UE-specific SS of a specific SS region of a specific time point. In addition, according to the implementation example, it is assumed that the UE monitors both the common SS and the UE-specific SS according to the conventional procedure and then receives the corresponding PDCCH at the UE-specific SS under the condition that a control channel (e.g., PDCCH) is detected in a control channel (or DCI) transmission limitation region.

In order to limit transmitting the same-size DCI format in the UE-specific SS, the following three methods may be considered. For convenience of description, the same-size DCI format established in the common SS is referred to as DCI_css, and the same-size DCI format established in the UE-specific SS is referred to as DCI_uss. 'DCI_css' may include DCI format 0 and DCI format 1A, each of which does not include a CIF of the 3GPP LTE system.

Figure 18A:
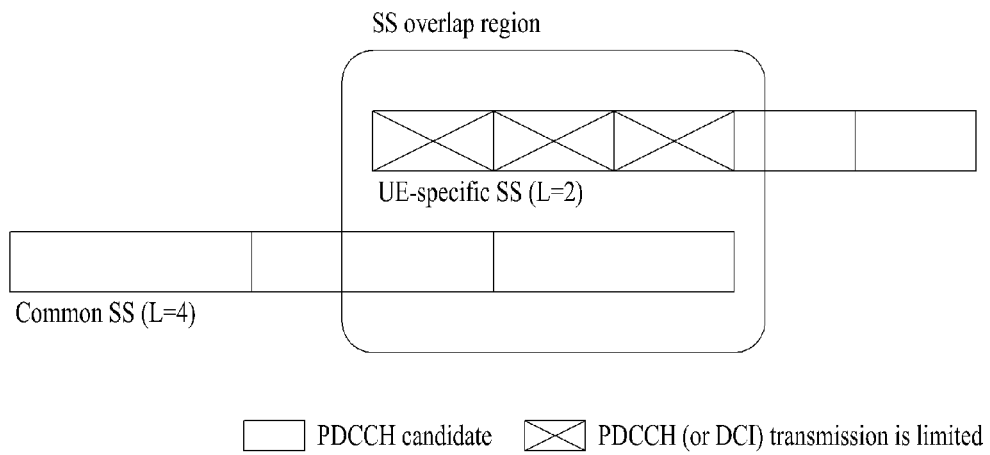

Case 1) Case 1 that is Applied Only to the Overlapped UE-Specific SS Region when the Overlap Region Occurs Between Two SSs The BS (eNB) does not transmit DCI_uss only to the overlap region at a specific time at which the overlap region occurs between the common SS and the UE-specific SS. FIG. 18A exemplarily shows the search space structure according to one embodiment of the present invention. Therefore, it is assumed that the UE transmits a control channel in the overlap region only through the common SS. That is, if the control channel (or UCI) is detected in the overlap region, the UE considers that the corresponding control channel is received in the common SS. In accordance with the implementation example, in association with the same-size DCI formats at the corresponding time point, the UE may perform reception/BD of DCI_css through the overlap region, and may perform reception/BD of DCI_uss through the UE-specific SS other than the overlap region. In other words, the UE may not monitor a control channel candidate for DCI_uss in the overlap region. In another example, the UE monitors all control channel candidates for DCI_css and DCI_uss in the overlap region. If a control channel is detected, the detected control channel is considered to be DCI_css. The above-mentioned method of the present invention can allocate DCI_uss to the UE-specific SS other than the overlap region, such that the scheduling flexibility reduction in the UE-specific SS can be minimized.

Figure 18B:
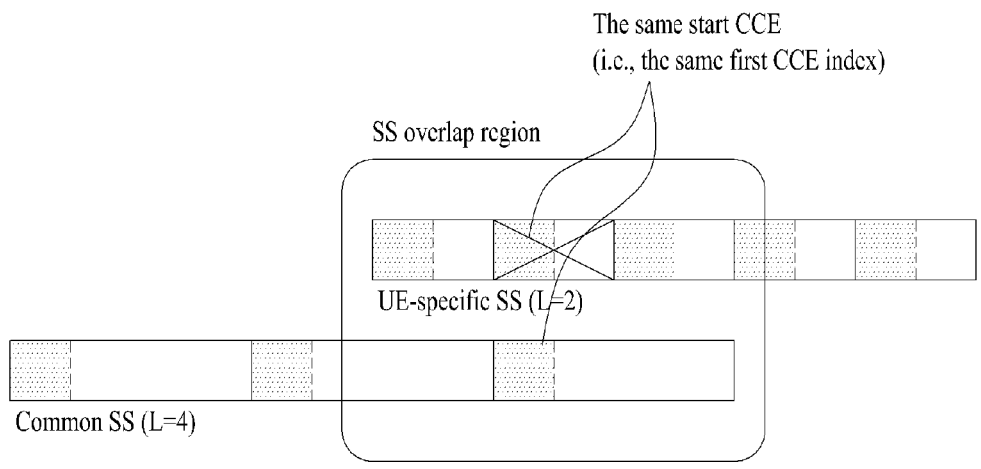
Figure 19:
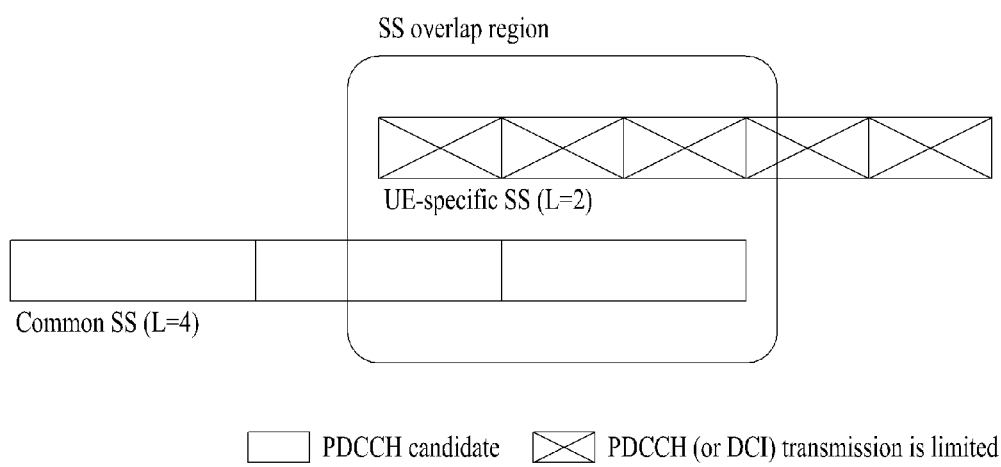

Preferably, the present invention can limit transmission of the control channel candidates in the common SS only when a control channel candidate of the common SS and a control channel candidate of the UE-specific SS have the same DCI (payload) size, the same RNTI (e.g., CRC-scrambled) and the same start resource (e.g., CCE) in the overlap region. FIG. 18B exemplarily shows a search space configuration and control channel candidate transmission according to one embodiment of the present invention.

Case 2) Case 2 that is Applied to the Entire Common SS Region when the Overlap Region Occurs Between Two SSs The BS (eNB) does not transmit DCI_uss to the entire UE-specific SS region only at a time point at which the overlap occurs between the common SS and the UE-specific SS. Therefore, it is assumed that, if the overlap region occurs, a control channel is transmitted only in the overlap region through the common SS. That is, it is assumed that, if a control channel is detected in the overlap region, the corresponding control channel is received in the common SS. In accordance with the implementation example, in association with the same-size DCI formats at the corresponding time point, the UE cannot perform reception/BD of DCI_uss through the entire UE-specific SS, and can perform reception/BD of DCI_css through the overlap region. In another example, the UE monitors all control channel candidates for DCI_css and DCI_css in the overlap region. If a control channel is detected, the detected control channel is considered to be DCI_css. While the above-mentioned method can further reduce scheduling flexibility in the UE-specific SS, it can reduce complexity needed when the overlap region and the non-overlap region are distinguished from each other.

Preferably, the present invention can limit control channel candidate transmission in the entire UE-specific SS by monitoring control channel candidates including the same DCI (payload) size, the same RNTI (e.g. CRC-scrambled) and the same start resource (e.g., CCE) in the common SS and the UE-specific SS.

Meanwhile, due to misalignment between the eNB and the UE related to recognition information as to whether the CIF is used during the CIF reconfiguration section through RRC signaling under the condition that multiple CCs are aggregated, a malfunction or erroneous operation may occur in PDCCH transmission/reception. In order to prevent the above-mentioned problem from being generated, there may be used a method for excluding the CIF from a PDCCH that schedules a specific CC (e.g., anchor CC (or PCC), or PDCCH monitoring CCs) from among the aggregated CCs, regardless of the cross-CC or non-cross-CC scheduling mode (i.e., regardless of CIF on/off setting). Irrespective of CIF reconfiguration, the eNB can transmit data including no CIF to a PDCCH of a specific CC (e.g., anchor CC (or PCC) or PDCCH monitoring CCs). In this case, regardless of CIF reconfiguration, the UE may receive/decode a PDCCH on the assumption that CIF does not exist in the corresponding CC at all times. Therefore, in association with scheduling of the corresponding CC during the CIF reconfiguration section, erroneous PDCCH transmission/reception operations can be prevented from being generated between the eNB and the UE. In this case, the above-mentioned SS overlap problem may be extended to the overlap problem between the UE-specific SS through which a DCI including no CIF is transmitted and the other UE-specific SS through which a DCI including a CIF is transmitted.

Therefore, if the SS overlap problem is generalized, this SS overlap problem may represent that a DCI format including no CIF (i.e., no CIF-DCI) and a DCI format (i.e., CIF-DCI) including a CIF have the same size and SSs used for transmission of the corresponding DCI formats may overlap with each other. In this case, similar to the above-mentioned example, the eNB may transmit only a DCI of a specific SS from among overlapped SSs in a specific time/region, and the UE may determine a DCI, that is decoded and CRC-passed through the specific time/region, to be a DCI of the specific SS. A detailed description for the above-mentioned operations is as follows.

A) Method A that is Applied Only to the Overlap Region Between SSs

A-1. Transmission of Only DCI Including CIF (I.e., CIF-DCI)

In the overlap region at a time point at which the overlap region occurs between SSs, the BS (eNB) may transmit only the CIF-DCI from among the same-size DCIs and may stop transmission of no CIF-DCI. In accordance with the implementation example, transmission limitation of no CIF-DCI may be achieved either in the process for allocating CCE resources to no CIF-DCI or in the actual transmission step of no CIF-DCI. In addition, according to the implementation example, transmission stoppage of no CIF-DCI may be achieved either through puncturing (or nulling) (or a kind of rate matching) prior to resource mapping or through puncturing (or nulling) after resource mapping. Preferably, the present invention may be limited to the case in which no CIF-DCI and the CIF-DCI carry the same RNTI (e.g., CRC is scrambled with the same RNTI). Therefore, in association with the same-size DCIs at the corresponding time point, the UE may recognize a DCI (i.e., PDCCH) detected through the overlap region as a CIF-DCI. For this purpose, according to the implementation example, the UE may perform reception/BD of only the CIF-DCI through the overlap region at the corresponding time point. That is, the UE may not monitor the control channel candidate for no CIF-DCI in the overlap region. In another example, the UE monitors control channel candidates of both no CIF-DCI and the CIF-DCI in the overlap region. If a PDCCH is detected, the detected PDCCH is recognized as CIF-DCI.

The present invention can be effectively applied to the overlap region between the common SS (for PDCCH monitoring CC) through which no CIF-DCI (e.g., DCI format 0/1A) is transmitted and the UE-specific SS (for PDCCH non-monitoring CC) through which the CIF-DCI is transmitted. DCI format 0/1A of the PDCCH monitoring CC can be transmitted not only through the common SS but also through the UE-specific SS. Therefore, although transmission of no CIF-DCI format 0/1A is limited in the overlap region, the corresponding DCI format 0/1A can be transmitted not only through the non-overlapped common SS region but also through the UE-specific SS for the PDCCH monitoring CC. The present invention can also be applied to the case in which the UE-specific SSs are overlapped with each other without change. That is, under the condition that the UE-specific SS through which the CIF-DCI is transmitted overlaps the other UE-specific SS through which no CIF-DCI is transmitted and the CIF-DCI and no CIF-DCI have the same size (e.g., payload size), only CIF-DCI transmission may be allowed in the SS overlap region. More specifically, under the condition that two certain SSs overlap with each other without distinction between the UE-specific SS and the common SS and CIF-DCI and no CIF-DCI have the same size, only CIF-DCI transmission may be allowed. The present invention may limit transmission of no CIF-DCI within the entire overlap region or may also limit transmission of no CIF-DCI only when a PDCCH candidate for no CIF-DCI and a PDCCH candidate for CIF-DCI are composed of the same start CCEs within the overlap region.

A-2. Transmission of Only DCI Including No CIF (I.e., No CIF-DCI)

In the overlap region at a time point at which the overlap region occurs between SSs, the BS (eNB) may transmit only no CIF-DCI from among the same-size DCIs and may stop transmission of CIF-DCI. In accordance with the implementation example, transmission limitation of CIF-DCI may be achieved either in the process for allocating CCE resources to CIF-DCI or in the actual transmission step of CIF-DCI. In addition, according to the implementation example, transmission stoppage of CIF-DCI may be achieved either through puncturing (or nulling) (or a kind of rate matching) prior to resource mapping or through puncturing (or nulling) after resource mapping. Therefore, the UE may recognize the same size DCI detected in the overlap region as no CIF-DCI at the corresponding time point. In addition, the UE may search for only no CIF-DCI in the overlap region. That is, the UE may not perform monitoring/BD of the CIF-DCI in the overlap region. Preferably, the present invention may be limited to the case in which no CIF-DCI and CIF-DCI carry the same RNTI (e.g., CRC is scrambled with the same RNTI). The present invention can be efficiently applied to the case in which a first SS (for anchor CC (or PCC) or PDCCH monitoring CC) through which no CIF-DCI considered for CIF reconfiguration is transmitted overlaps a second SS (for non-anchor CC (or PCC) or PDCCH non-monitoring CC) through which CIF-DCI is transmitted. The present invention can be applied not only to the overlap region between the common SS (no CIF-DCI) and the UE-specific SS (CIF-DCI), but also to the overlap region between the UE-specific SS (no CIF-DCI) and the other UE-specific SS (CIF-DCI). There is a possibility that importance/frequency of data transmitted through the anchor CC (or PCC) or the PDCCH monitoring CC is higher than those of other CCs. Therefore, the above-mentioned method of the present invention may first guarantee the degree of freedom of the scheduling related to the anchor CC (or PCC) or the PDCCH monitoring CC. More specifically, under the condition that two certain SSs overlap with each other without distinction between the UE-specific SS and the common SS, and CIF-DCI and no CIF-DCI have the same size, only transmission of no CIF-DCI may be allowed. The present invention may limit transmission of CIF-DCI within the entire overlap region or may also limit transmission of CIF-DCI only when a PDCCH candidate for no CIF-DCI and a PDCCH candidate for CIF-DCI are composed of the same start CCEs within the overlap region.

A-3. Method A-1 and Method A-2 May be Selectively Used According to SS

If the UE-specific SS of the CIF-DCI and the common SS of no CIF-DCI have the same DCI size and overlap with each other, transmission of no CIF-DCI may be limited in the overlap region at the overlap time point. In addition, under the condition that the UE-specific SS of CIF-DCI and the other UE-specific SS of no CIF-DCI have the same DCI size and overlap with each other, CIF-DCI transmission may be limited in the overlap region at the overlap time point. The present invention may limit transmission of specific DCI in the entire overlap region, or may limit transmission of a specific DCI only when a PDCCH candidate for no CIF-DCI and a PDCCH candidate for CIF-DCI are composed of the same start CCEs within the overlap region.

Method B) Method B is Applied Only to the Entirety of a Specific SS Region when the Overlap Region Occurs Between SSs B-1. Transmission of Only DCI Including CIF (I.e., CIF-DCI)

In each SS region at a time point at which the overlap region occurs between SSs, the BS (eNB) may transmit only the CIF-DCI from among the same-size DCIs and may stop transmission of no CIF-DCI. In more detail, the BS (eNB) may transmit the CIF-DCI through its own SS including the overlap region, and the BS (eNB) may stop transmitting no CIF-DCI through its own SS including the overlap region. Therefore, the UE may detect only CIF-DCI of the same-size DCIs at the corresponding time point.

B-2. Transmission of Only DCI Including No CIF (I.e., No CIF-DCI)

In each SS region at a time point at which the overlap region occurs between SSs, the eNB may transmit only no CIF-DCI from among the same-size DCIs, and may stop transmission of CIF-DCI. In more detail, the eNB may transmit no CIF-DCI through its own overall SS including the overlap region, and the eNB may stop transmission of CIF-DCI through its own overall SS including the overlap region. Therefore, the UE may detect only no CIF-DCI in association with the same-size DCIs at the corresponding time point.

B-3. Method B-1 and Method B-2 May be Selectively Used According to SS

If the UE-specific SS of CIF-DCI and the common SS of no CIF-DCI have the same DCI size and overlap each other, the BS (eNB) may limit transmission of no CIF-DCI within each SS region at the overlap time point. In addition, if the UE-specific SS of CIF-DCI and the other UE-specific SS of no CIF-DCI have the same size and overlap with each other, the BS (eNB) may limit CIF-DCI transmission within each SS region at the overlap time point. The above-mentioned example exemplarily shows the case in which selection information as to whether CIF-DCI or no CIF-DCI is to be transmitted at the SS overlap occurrence time is promised between the BS (eNB) and the UE. In contrast, selection information as to whether CIF-DCI or no CIF-DCI is to be transmitted at the SS overlap occurrence time may be semi-statically established through higher layer signaling (e.g., RRC signaling).

On the other hand, if the BS (eNB) maps a DCI to a specific CCE aggregation level and transmits the mapped result, a DCI codeword may be repeated in units of a predetermined number of CCEs due to circular-buffer characteristics. As a result, the corresponding DCI may be detected at a CCE aggregation level lower than the corresponding CCE aggregation level during the UE blind decoding (BD) process. Considering the above-mentioned situation, in association with two SSs (e.g., the common SS having no CIF and the UE-specific SS having CIF) having the same DCI format size, the above-mentioned method can be applied not only to all CCE aggregation levels (e.g., L=1, 2, 4, 8) of the UE-specific SS, but also to a specific CCE aggregation level (for example, L=4, 8) (e.g., the same CCE aggregation level as that of the common SS). In other words, if the UE-specific SS has L=1 or L=2 and the overlap region occurs between the UE-specific SS and the common SS, the SS shifting scheme, the SS start point limitation scheme, and the method for limiting transmission of no CIF-DCI or CIF-DCI may not be used as necessary.

In addition, in order to prevent the occurrence of ambiguity of the CCE aggregation level, if a DCI detected in a PDCCH candidate of the smaller CCE aggregation level (e.g., L=1 and/or L=2) and a DCI detected in a PDCCH candidate of the larger CCE aggregation level (e.g., L=4 and/or L=8) are simultaneously present in the CCE group starting from the same CCE, the UE may discard the DCI detected in the smaller CCE aggregation level and may use only the DCI detected in the larger CCE aggregation level as control information. For example, if only CIF-DCI is supported in the smaller CCE aggregation level and only no CIF-DCI is supported in the larger CCE aggregation level, and if CRC-checked DCIs are present in both the larger CCE aggregation level and the smaller CCE aggregation level, each CRC-checked DCI may be interpreted as the DCI (i.e., no CIF-DCI) of the larger CCE aggregation level. Alternatively, in order to obtain the same result, if the larger CCE aggregation level (e.g., L=4 and/or L=8) is detected in the specific CCE group, the present invention may not attempt to detect the smaller CCE aggregation level (e.g., L=1 and/or L=2) in the corresponding CCE group.

More specifically, the present invention may use the aforementioned proposed methods only when the SS having no CIF-DCI and the other SS having CIF-DCI have the same CCE aggregation level and the same DCI size, and then overlap with each other. If the SS having no CIF-DCI and the SS having CIF-DCI have the same size and different CCE aggregation levels, and overlap with each other, and if DCIs successfully detected through PDCCH candidates of different CCE aggregation levels (i.e., high or low CCE aggregation levels) are simultaneously present in the CCE groups starting from the same CCE, the UE may discard the DCI detected in the smaller CCE aggregation level and may use only the DCI detected in the larger CCE aggregation level as control information. Alternatively, in order to obtain the same result, if the larger CCE aggregation level is detected in the specific CCE group, the present invention may not attempt to detect the smaller CCE aggregation level in the corresponding CCE group.

Embodiment 2

SS Allocation for Preventing Collision Between UE-Specific SSs

LTE-A considers cross-CC scheduling using a CIF under the condition that multiple CCs are aggregated, such that it may be possible to transmit multiple PDCCHs for scheduling multiple CCs through a single DL CC. For this purpose, a method for configuring multiple UE-specific SSs for multiple CCs in the corresponding DL CC may be used. Individual UE-specific SSs may be classified according to individual CCs or DCI format sizes. In this case, individual UE-specific SSs may have independent start CCE indexes and may be configured independent of each other. Alternatively, multiple UE-specific SSs may have only one start point and may be configured to be concatenated. That is, multiple UE-specific SSs may be composed of concatenated SSs.

Figure 20:
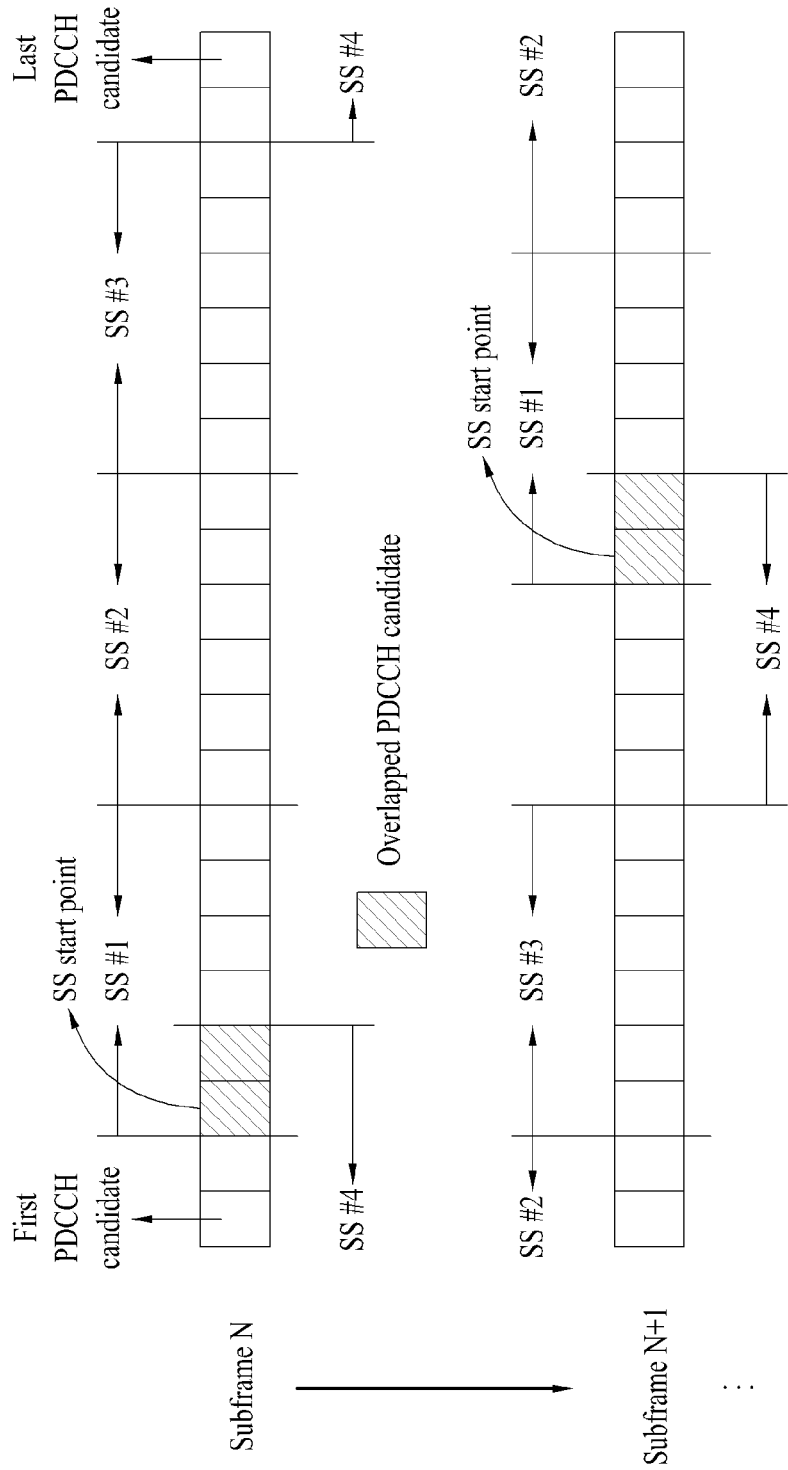
FIG. 20 exemplarily shows PDCCH blocking for use in a concatenated search space.

FIG. 20 exemplarily shows PDCCH blocking encountered in the concatenated SS.

Referring to FIG. 20, if the allocation position or order of each SS constructing the entire SSs within the concatenated SS is fixed in all subframes, the overlap region may occur only between specific SSs. The above-mentioned example shows that four SSs on a single DL CC have a single start point and a fixed SS order (#1→#2→#3→#4) and configures the concatenated SS, such that it can be recognized that the overlap region occurs between SS #1 and SS #4 as can be seen from FIG. 20. In this example, for convenience of description, it is assumed that 6 PDCCH candidates are allocated to each SS and a total number of CCEs may be set to 22. In this case, since specific SSs causing the overlap region are fixed, the PDCCH scheduling freedom degree is reduced only in the corresponding SSs (that is, the probability of PDCCH blocking is increased). In this case, PDCCH blocking may indicate that PDCCH scheduling of the corresponding carrier is restricted due to the limited PDCCH resources. In other words, as can be seen from FIG. 20, if multiple PDCCH search spaces are defined in one carrier, available resources of the PDCCH search space corresponding to each carrier may be limited due to the limited PDCCH resources. As a result, the PDCCH allocation position may be limited or it may be impossible to perform PDCCH allocation.

Although FIG. 20 shows that the concatenated SSs of one UE are wrap-around processed and overlap each other, the scope or spirit of the present invention is not limited thereto and such SS overlapping may occur due to a variety of reasons. For example, if the concatenated SSs of one UE are not wrap-around processed, and if the concatenated SS of the corresponding UE overlaps the concatenated SS of another UE, only SSs of the specific CC overlap each other, such that only the SSs of the specific CC may be intensively limited as necessary.

This embodiment of the present invention may propose a method for changing the allocation order of each SS constructing the concatenated SS. Each SS allocation order may be periodically changed (e.g., in units of each subframe). In this example, CCE may be limited only to a CCE capable of being used as a PDCCH candidate in the corresponding CCE aggregation level.

The embodiments of the present invention will hereinafter be described with reference to FIGS. 21 to 24. Although individual SSs contained in the concatenated SS are contiguous to each other in FIGS. 21 to 24, the scope or spirit of the present invention is not limited thereto, and individual SSs contained in the concatenated SS may be configured at intervals of a specific offset configured in units of CCE or PDCCH candidate or may overlap each other.

Figure 21:
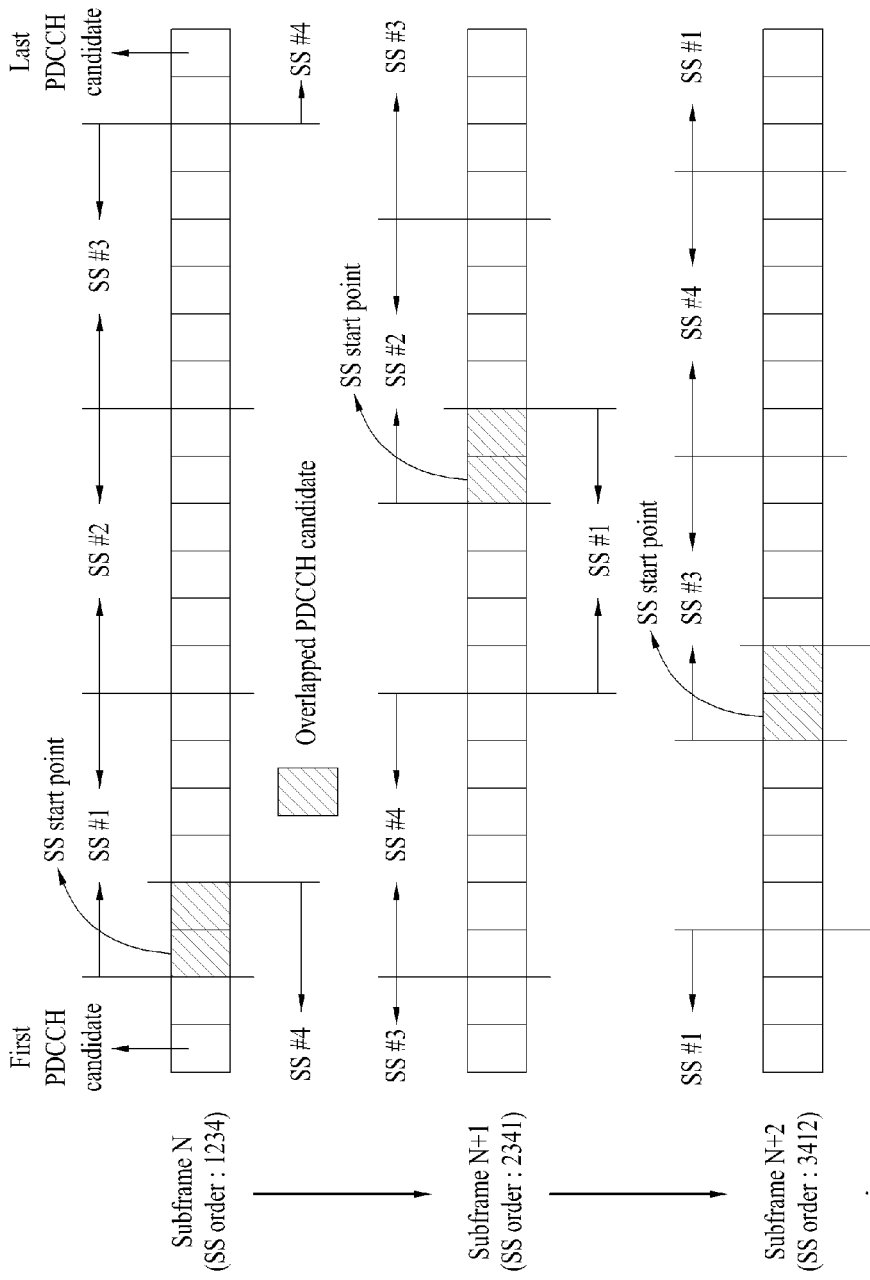
FIGS. 21 to 24 exemplarily show various methods for constructing a concatenated search space according to another embodiment of the present invention.
Figure 22:
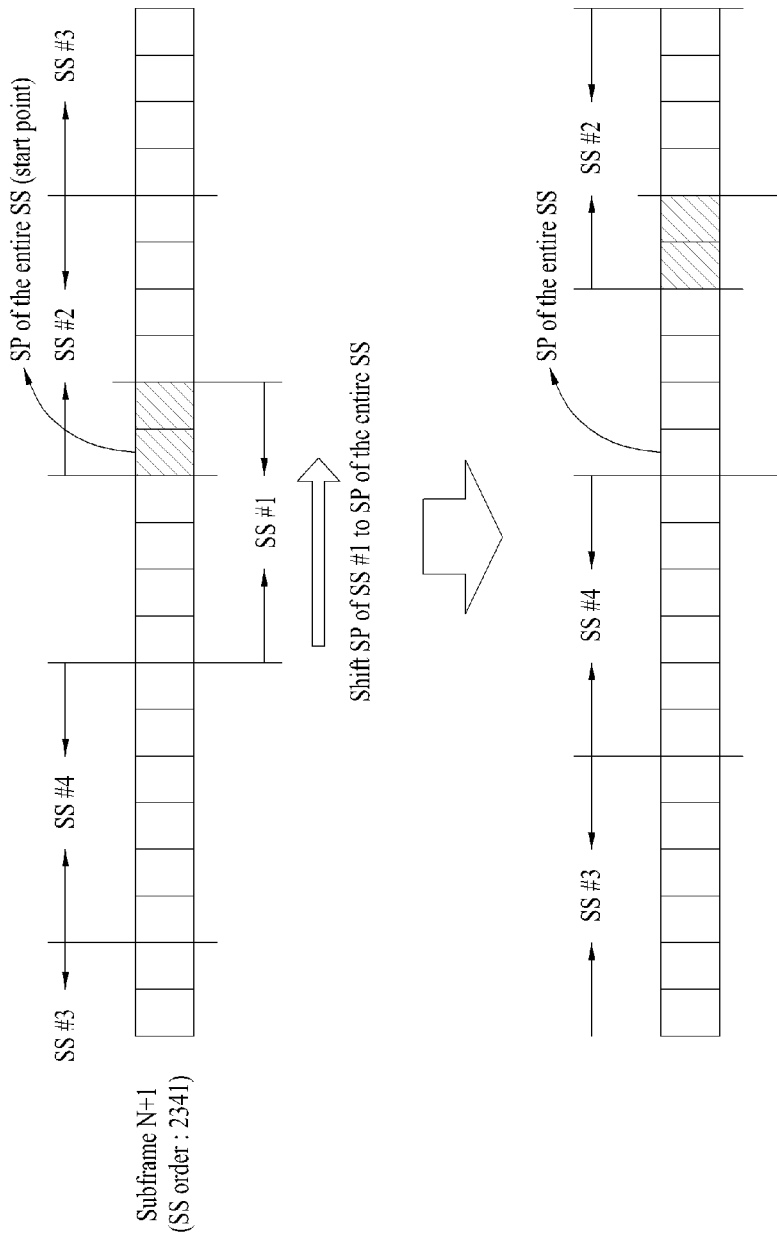
Figure 23:
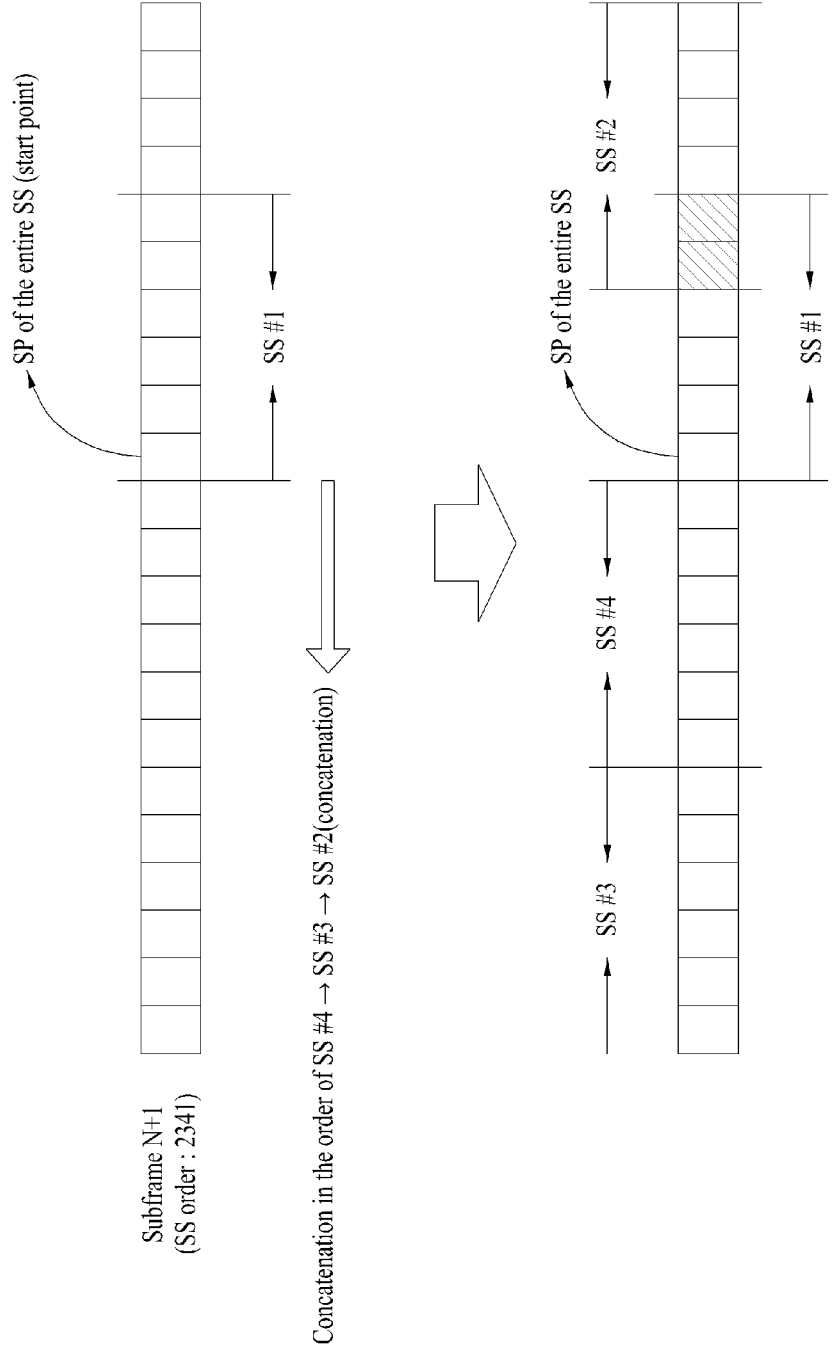

As can be seen from FIG. 21, a method for cyclically shifting the order of each SS contained in the entire SS at intervals of a predetermined time (e.g., P subframes, P radio frames, or the like) may be used as necessary. P may be an integer of more than 1. Preferably, P may be set to 1. The cyclic shift value may be changed at intervals of a predetermined time, and may be determined to be a function such as a subframe number, a system frame number (SFN) or the like. As a result, individual SSs, each of which has the overlap possibility, may be periodically changed and allocated. Therefore, the probability of PDCCH blocking is not concentrated in a specific SS, and may be evenly distributed to all individual SSs.

On the other hand, in order to prevent the occurrence of misalignment between the eNB and the UE related to the SS location within the CIF reconfiguration section, the SS position of the anchor CC (or PCC) and/or the SS position of the PDCCH monitoring CC are always fixed in the entire SS, and the allocation order of each SS other than the anchor CC (or PCC) and/or the PDCCH monitoring CC may be periodically changed in the remaining CCEs. Preferably, the SS position(s) of the anchor CC (or PCC) and/or the PDCCH monitoring CC may first be allocated to the CCE group having the lowest index from among all SSs.

In addition, the eNB configures the concatenated SS by applying the proposed method to N CCs regardless of CIF configuration (i.e., CIF on/off), and the UE may also perform blind decoding (BD) of only M CCs (where M≤N). In this case, N is a predetermined maximum number of CCs, the number of CCs deployed in a cell, or the number of CCs (e.g., the number of RRC-allocated UE-specific CCs, the number of cross-CC scheduled CCs from the corresponding PDCCH monitoring CC, and the like) semi-statically established in the corresponding UE. M may be set to the number of cross-CC scheduled CCs from the PDCCH monitoring CC according to CIF configuration, or may also be set to 1 (indicating only the corresponding PDCCH monitoring CC).

In another method, after configuring each SS using the concept shown in FIG. 21, the SS start point(s) of the anchor CC (or PCC) and/or the PDCCH monitoring CC may be shifted to the start point of the entire SS. For example, as can be seen from FIG. 22, under the condition that the SS order is denoted by '2341' and SS #1 is SS of the anchor CC (or PCC) and/or the PDCCH monitoring CC, the start point of SS #2 is set to the start point of the entire SS such that all the SSs are configured, the entire SS (in which SS #1 and SS #2 overlap each other) is shifted in such a manner that the start point of SS #1 is located at the start point of the entire SS, resulting in configuration of the last SS. Similar to FIG. 22, as can be seen from FIG. 23, after configuring SS #1 in a manner that the start point of SS (SS #1) of the anchor CC (or PCC) and/or the PDCCH monitoring CC is identical to the start point of the entire SS, the remaining SSs (SS #2, #3, #4) may be concatenated in the left and/or right direction of SS #1 according to the SS order, resulting in configuration of the concatenated SS.

The present invention performs random interleaving of all PDCCH candidates of each SS in units of a PDCCH candidate, such that it can configure the concatenated SS. In more detail, the interleaving pattern may be randomized with a specific period (e.g., P subframes, P radio frames, and the like). P is an integer equal to or higher than 1. Preferably, P is set to 1 (P=1). However, it should be noted that the scope or spirit of the present invention is not limited thereto, and the interleaving pattern for each period may be determined to be any one of functions such as a subframe number, a system frame number (SFN), etc. In addition, an input/output (I/O) unit of the interleaver (i.e., a CCE aggregation level) may have a resolution of a PDCCH candidate. For example, if individual SSs are concatenated and input to the interleaver, permutation is performed in units of a PDCCH candidate regardless of the order of individual SSs or the order of PDCCH candidate, such that the permutation result is finally output.

Figure 24:
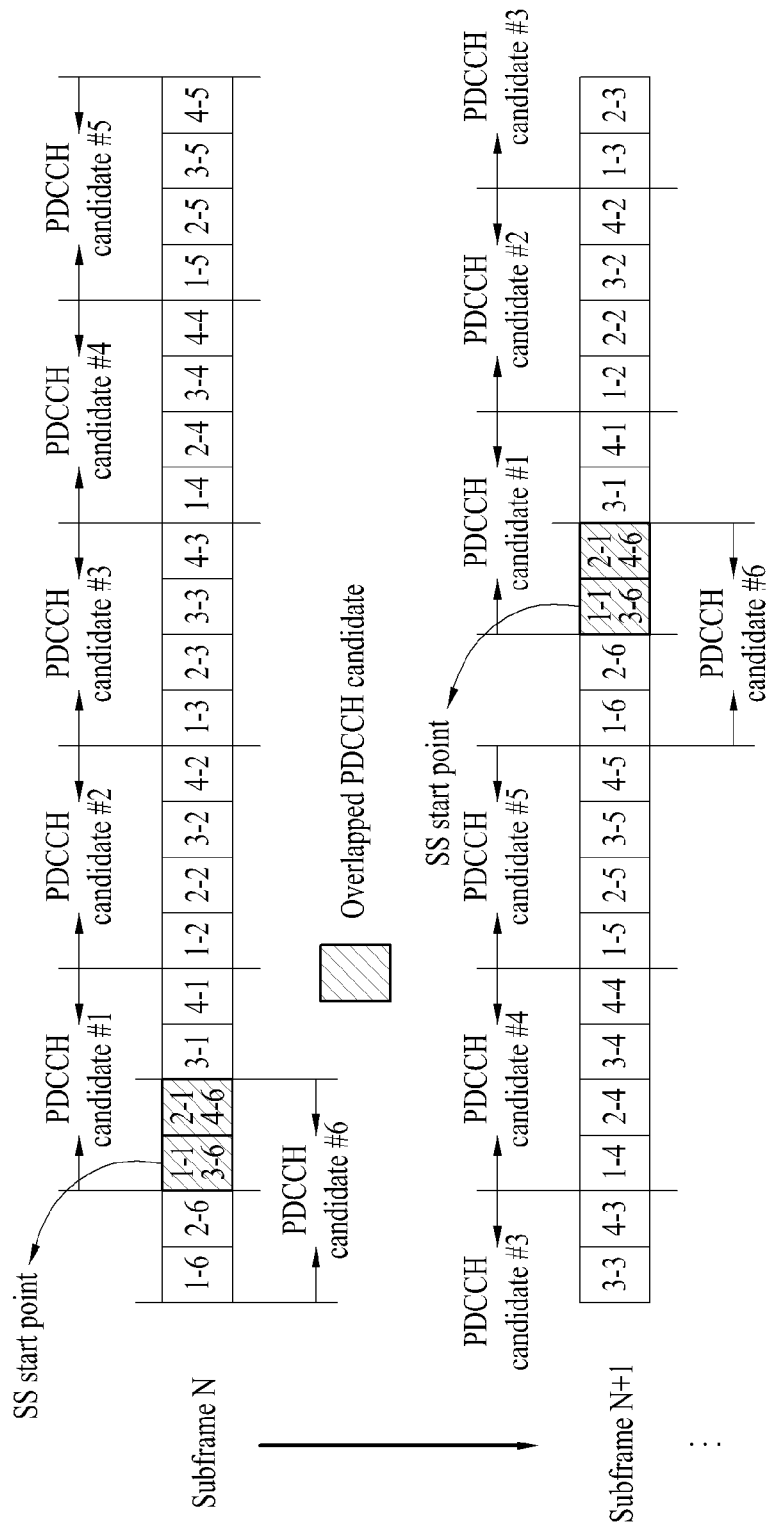

FIG. 24 exemplarily shows interleaving of all PDCCH candidates of individual SSs. For convenience of description, the Y-th PDCCH candidate in the X-th SS (SS #X) is denoted by X-Y.

Referring to FIG. 24, PDCCH candidates corresponding to the same order within individual SSs are collected and concatenated to each other, such that the concatenated SS can be configured. For convenience of description and better understanding of the present invention, it is assumed that four SSs exist and 6 PDCCH candidates are present in each SS. In this case, PDCCH candidates 1-1 to 1-4 selected from among respective SSs are concatenated in the region for PDCCH candidate #1. Similarly, the regions for PDCCH candidate #2 to PDCCH candidate #6 are also configured, resulting in configuration of the concatenated SS in which PDCCH candidates #1~#6 are concatenated. Although the regions for individual PDCCH candidates #X (X=1~6) are concatenated as shown in FIG. 24, the concatenated regions are disclosed only for illustrative purposes, and the scope or spirit of the present invention is not limited thereto. If necessary, the concatenated regions may be configured at intervals of a specific offset configured in units of either the region CCE for each PDCCH candidate #X (X=1~6) or a PDCCH candidate, or may overlap with each other.

For convenience of description and better understanding of the present invention, PDCCH candidates located in the region for each PDCCH candidate #X (where X=1~6) are denoted by a PDCCH candidate group #X (where X=1~6). The order of PDCCH candidates within each PDCCH candidate group #X (X=1~6) may be fixed in all subframes according to the order (#1→#2→#3→#4) of individual SSs as shown in the annexed drawings. In addition, the order of PDCCH candidates may be periodically changed within each PDCCH group #X (X=1~6) as shown in FIG. 21. For example, the order of PDCCH candidates may be cyclically shifted in units of a subframe within each PDCCH group #X (X=1~6). In addition, the order of concatenated PDCCH candidates #X (X=1~6) may also be periodically changed as shown in FIG. 21. Through the above-mentioned operation, PDCCH candidates capable of being overlapped with each other are not concentrated in a specific SS and are distributed into all individual SSs, such that the probability of causing PDCCH blocking may be evenly distributed into all individual SSs.

On the other hand, in order to prevent the occurrence of misalignment between the eNB and the UE in association with the SS position during the CIF reconfiguration period, the SS configuration and position of the anchor CC (or PCC) and/or the PDCCH monitoring CC within the entire SS are always fixed in a manner that all PDCCH candidates are concatenated. And, for only individual SSs other than the anchor CC (or PCC) and/or the PDCCH monitoring CC in association with the remaining CCEs, each SS in which PDCCH candidates are interleaved may be configured. Preferably, SS(s) of the anchor CC (or PCC) and/or the PDCCH monitoring CC may first be allocated to a CCE group having the lowest index from among all the SSs.

In addition, the BS (eNB) may configure the concatenated SSs by applying the proposed method to N CCs regardless of CIF configuration (i.e., CIF on/off), and the UE may also perform blind decoding (BD) of only M CCs (where M≤N). In this case, N is a predetermined maximum number of CCs, the number of CCs deployed in a cell, or the number of CCs (e.g., the number of RRC-allocated UE-specific CCs, the number of cross-CC scheduled CCs from the corresponding PDCCH monitoring CC, and the like) semi-statically established in the corresponding UE. M may be set to the number of cross-CC scheduled CCs from the PDCCH monitoring CC according to CIF configuration, or may also be set to 1 (indicating only the corresponding PDCCH monitoring CC).

In addition, independent start CCE indexes are allocated to individual PDCCH candidate groups, such that SSs for individual PDCCH candidate groups may be configured independent of each other. In this case, SSs for individual PDCCH candidate groups need not be concatenated.

On the other hand, the proposed method of the present invention may be applied to all CCE aggregation levels (e.g., L=1, 2, 4, 8) without limitation, or may also be applied to a specific CCE aggregation level (e.g., L=4 or 8). The specific CCE aggregation level indicates a CCE aggregation level in which the number of CCEs constructing the PDCCH candidate is relatively high.

Figure 25:
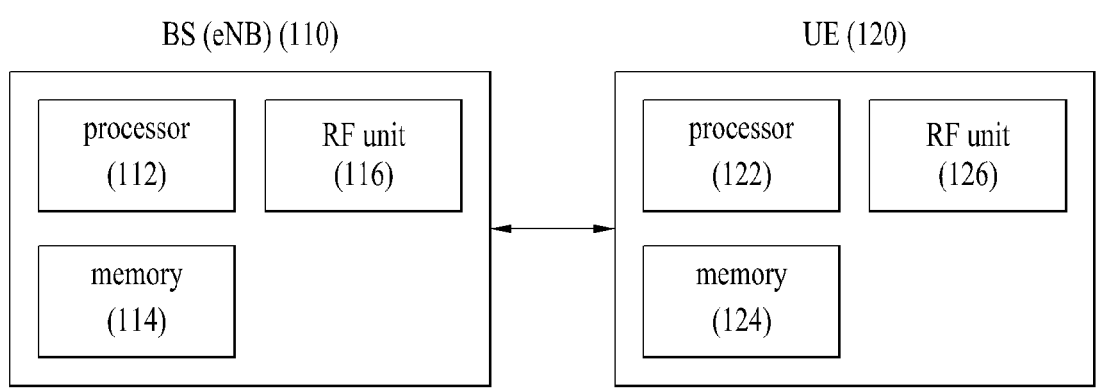
FIG. 25 is a block diagram illustrating a base station (BS) and a user equipment (UE) applicable to the embodiments of the present invention.

FIG. 25 is a block diagram illustrating a BS (eNB) and a UE applicable to the embodiments of the present invention.

Referring to FIG. 25, the wireless communication system includes a base station (BS) 110 (also denoted by 'eNB') and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Exemplary embodiments of the present invention can be applied to wireless communication systems such as a UE, a relay node (RN), and a BS (or eNB).

The invention claimed is:

1. A method for receiving a control channel by a user equipment (UE) in a wireless communication system supporting multiple carriers, the method comprising:
    receiving control information through a subframe, wherein the control information is present in one of a plurality of search spaces and each of the plurality of search spaces corresponds to each of the multiple carriers; and
    monitoring control channel candidates for the control information in the plurality of search spaces,
    wherein the plurality of search spaces is concatenated according to an allocation pattern, and the allocation pattern is changed with time, and
    wherein if a start resource of a search space for a primary component carrier (CC) is not identical to a start point of the plurality of search spaces, the plurality of search spaces is shifted in a manner that the start resource of the search space for the primary CC is identical to the start point.

2. The method according to claim 1, wherein:
    the start point includes a start resource of a firstly allocated search space from among the plurality of search spaces, and
    the start point is hopped in units of a subframe in the resource region for the control channel.

3. The method according to claim 1, wherein an order for allocating individual search spaces within the plurality of search spaces is cyclically shifted according to time.

4. The method according to claim 1, wherein a direction for allocating the plurality of search spaces is changed with time in the resource region for the control channel.

5. The method according to claim 1, wherein the plurality of search spaces includes a UE-specific search space, and control channel candidates belonging to different UE-specific search spaces are distinguished from each other using a carrier indicator field (CIF) value.

6. The method according to claim 1, wherein the control channel includes a physical downlink control channel (PDCCH) including a carrier indicator field (CIF), and a resource for the control channel includes a control channel element (CCE).

7. A user equipment (UE) configured to receive a control channel in a wireless communication system supporting multiple carriers, the user equipment (UE) comprising:
    a radio frequency (RF) unit; and
    a processor operatively coupled to the RF unit,
    wherein the processor receives control information through a subframe, and monitors control channel candidates for the control information in a plurality of search space,
    wherein the control information is present in one of the plurality of search spaces, and each of the plurality of search spaces corresponds to each of the multiple carriers, and
    the plurality of search spaces is concatenated according to an allocation pattern, and the allocation pattern is changed with time, and
    wherein if a start resource of a search space for a primary component carrier (CC) is not identical to a start point of the plurality of search spaces, the plurality of search spaces is shifted in a manner that the start resource of the search space for the primary CC is identical to the start point.

8. The user equipment (UE) according to claim 7, wherein:
    the start point includes a start resource of a firstly allocated search space from among the plurality of search spaces, and the start point is hopped in units of a subframe in the resource region for the control channel.

9. The user equipment (UE) according to claim 7, wherein an order for allocating individual search spaces within the plurality of search spaces is cyclically shifted according to time.

10. The user equipment (UE) according to claim 7, wherein a direction for allocating the plurality of search spaces is changed with time in the resource region for the control channel.

11. The user equipment (UE) according to claim 7, wherein the plurality of search spaces includes a UE-specific search space, and control channel candidates belonging to different UE-specific search spaces are distinguished from each other using a carrier indicator field (CIF) value.

12. The user equipment (UE) according to claim 7, wherein the control channel includes a physical downlink control channel (PDCCH) including a carrier indicator field (CIF), and a resource for the control channel includes a control channel element (CCE).

* * * * *